US012694851B2

(12) United States Patent (10) Patent No.: US 12,694,851 B2

Kurota (45) Date of Patent: Jul. 28, 2026

(54) DISPLAY METHOD, IMAGE GENERATION DEVICE, AND NON-TRANSITORY COMPUTER-READABLE STORAGE MEDIUM STORING PROGRAM

(71) Applicant: SEIKO EPSON CORPORATION, Tokyo (JP)

(72) Inventor: Ippei Kurota, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 183 days.

(21) Appl. No.: 18/498,190

(22) Filed: Oct. 31, 2023

(65) Prior Publication Data

US 2024/0144896 A1 May 2, 2024

(30) Foreign Application Priority Data

Oct. 31, 2022 (JP) ................................. 2022-174888

(51) Int. Cl.
G09G 5/373 (2006.01)
G06T 3/40 (2024.01)
(52) U.S. Cl.
CPC .............. G09G 5/373 (2013.01); G06T 3/40 (2013.01); *G09G 2340/04* (2013.01)
(58) Field of Classification Search
CPC .............. G09G 5/373; G09G 2340/04; G09G 2320/0233; G09G 2340/0442;
(Continued)

(56) References Cited

U.S. PATENT DOCUMENTS 9,294,747 B2 * 3/2016 Tanabe ..................... G09G 5/14
9,305,333 B1 * 4/2016 Upson ....................... G06T 3/60
(Continued)

FOREIGN PATENT DOCUMENTS

JP 2008109507 A * 5/2008
JP 2012-247447 A 12/2012
(Continued)

OTHER PUBLICATIONS

Wang et al. Automatic geometry calibration for multi-projector display systems with arbitrary continuous curved surfaces [Online]. Apr. 25, 2019 [Retrieved on Nov. 17, 2025]. Retrieved from the Internet: < URL: https://ietresearch.onlinelibrary.wiley.com/doi/10. 1049/iet-ipr.2018.5575 > (Year: 2019).*

*Primary Examiner* — King Y Poon
*Assistant Examiner* — Michelle H Ma
(74) *Attorney, Agent, or Firm* — Dority & Manning, P.A.

(57) ABSTRACT

A display method includes acquiring a rectangular first image and, when a half value of a first size indicating a size on a first axis of a rectangular display region where an image is displayed by one or more display devices is equal to or smaller than a second size indicating a size on the first axis of the first image, the one or more display devices displaying, in the display region, a first display image including the first image arranged in a first position, where a first side orthogonal to the first axis and located on one side of the first axis among four sides of the display region and a third side orthogonal to the first axis and located on the one side among four sides of the first image are in contact.

22 Claims, 12 Drawing Sheets

(58) Field of Classification Search
CPC ........... G09G 3/001; G09G 2340/0464; G09G 2340/0471; G09G 2340/0478; G09G 2340/0485; G06T 3/40; G06T 7/30; G06T 11/00
See application file for complete search history.

(56) References Cited

U.S. PATENT DOCUMENTS

| | | | |
|---|---|---|---|
| 9,383,916 B2 * | 7/2016 | Srinivasan | ............ G06F 3/0488 |
| 2006/0290688 A1 * | 12/2006 | Chae | ......................... G06T 3/60 |
| | | | 345/204 |
| 2010/0201645 A1 * | 8/2010 | Asami | ................... G06F 3/1438 |
| | | | 715/810 |
| 2017/0278217 A1 * | 9/2017 | Takahashi | ................. G06T 3/40 |
| 2019/0235371 A1 | 8/2019 | Imai | |
| 2021/0158730 A1 | 5/2021 | Kondo et al. | |
| 2024/0054706 A1 * | 2/2024 | Song | ....................... G06T 11/60 |

FOREIGN PATENT DOCUMENTS

| | | | |
|---|---|---|---|
| JP | 2015176374 A | * | 10/2015 |
| JP | 2019-134263 A | | 8/2019 |
| WO | WO2019/198381 A | | 10/2019 |

* cited by examiner

*FIG. 8*

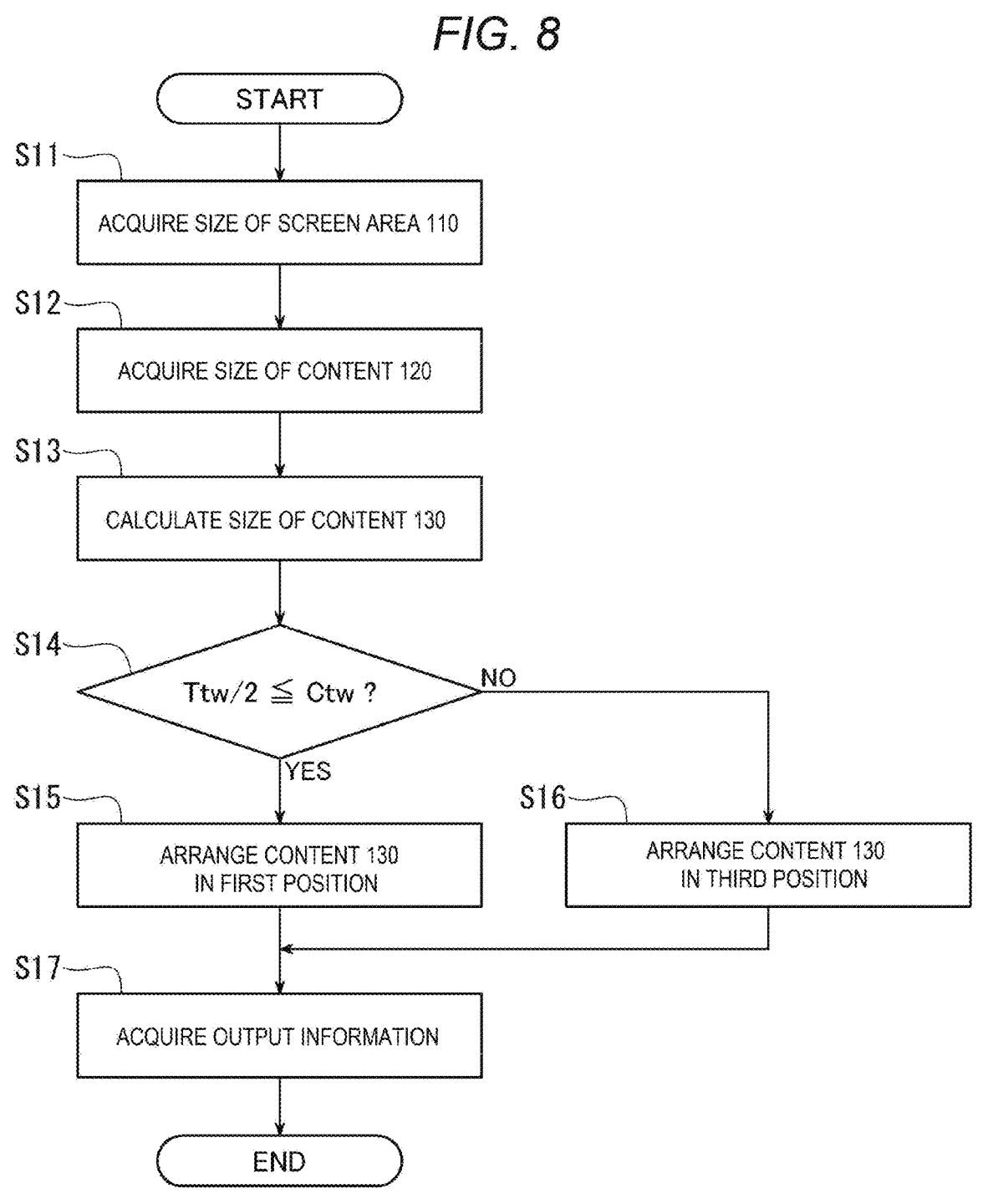

START

S11 — ACQUIRE SIZE OF SCREEN AREA 110

S12 — ACQUIRE SIZE OF CONTENT 120

S13 — CALCULATE SIZE OF CONTENT 130

S14 — $Ttw/2 \leqq Ctw$ ?

NO

YES

S15 — ARRANGE CONTENT 130 IN FIRST POSITION

S16 — ARRANGE CONTENT 130 IN THIRD POSITION

S17 — ACQUIRE OUTPUT INFORMATION

END

FIG. 11

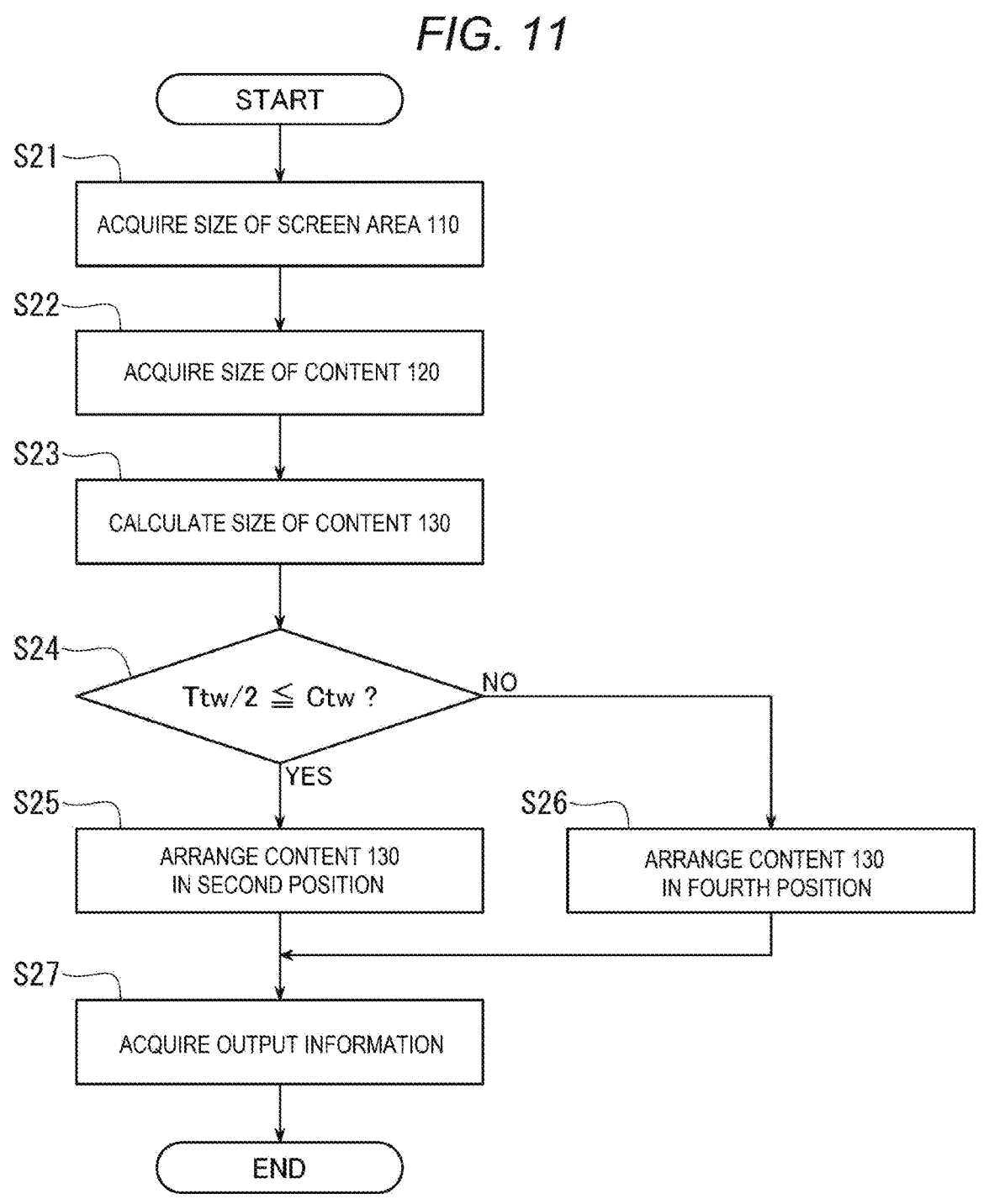

START

S21 — ACQUIRE SIZE OF SCREEN AREA 110

S22 — ACQUIRE SIZE OF CONTENT 120

S23 — CALCULATE SIZE OF CONTENT 130

S24 — Ttw/2 ≦ Ctw ?

NO

YES

S25 — ARRANGE CONTENT 130 IN SECOND POSITION

S26 — ARRANGE CONTENT 130 IN FOURTH POSITION

S27 — ACQUIRE OUTPUT INFORMATION

END

START

S31 — MODE CHANGE OPERATION IS RECEIVED?

NO

YES

S32 — CHANGE MODE

S33 — FIRST MODE?

NO

YES

S34 — LEFT ARRANGEMENT ALGORITHM

S35 — RIGHT ARRANGEMENT ALGORITHM

END

*FIG. 17*

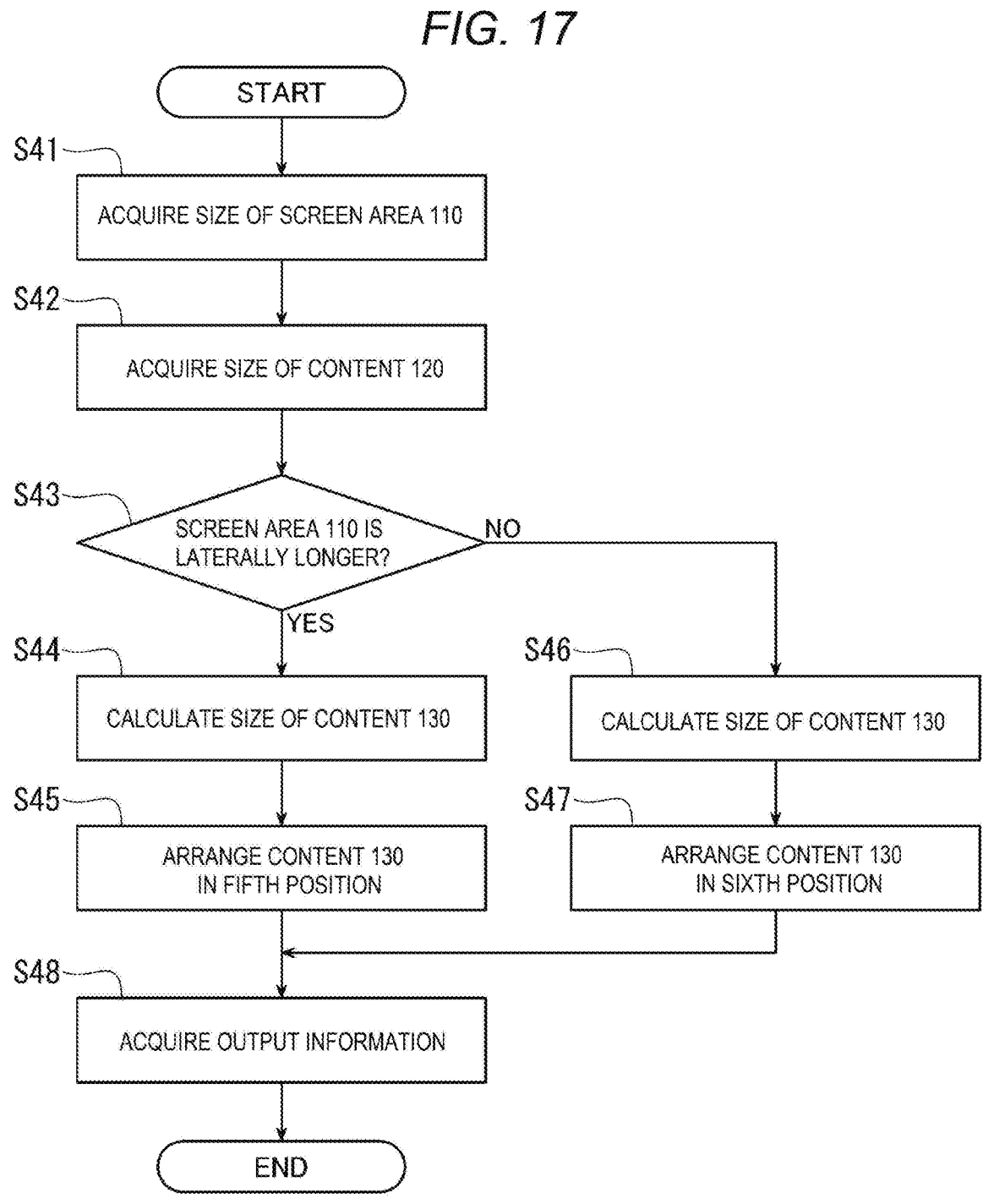

START

S41 — ACQUIRE SIZE OF SCREEN AREA 110

S42 — ACQUIRE SIZE OF CONTENT 120

S43 — SCREEN AREA 110 IS LATERALLY LONGER?

NO

YES

S44 — CALCULATE SIZE OF CONTENT 130

S46 — CALCULATE SIZE OF CONTENT 130

S45 — ARRANGE CONTENT 130 IN FIFTH POSITION

S47 — ARRANGE CONTENT 130 IN SIXTH POSITION

S48 — ACQUIRE OUTPUT INFORMATION

END

*FIG. 18*

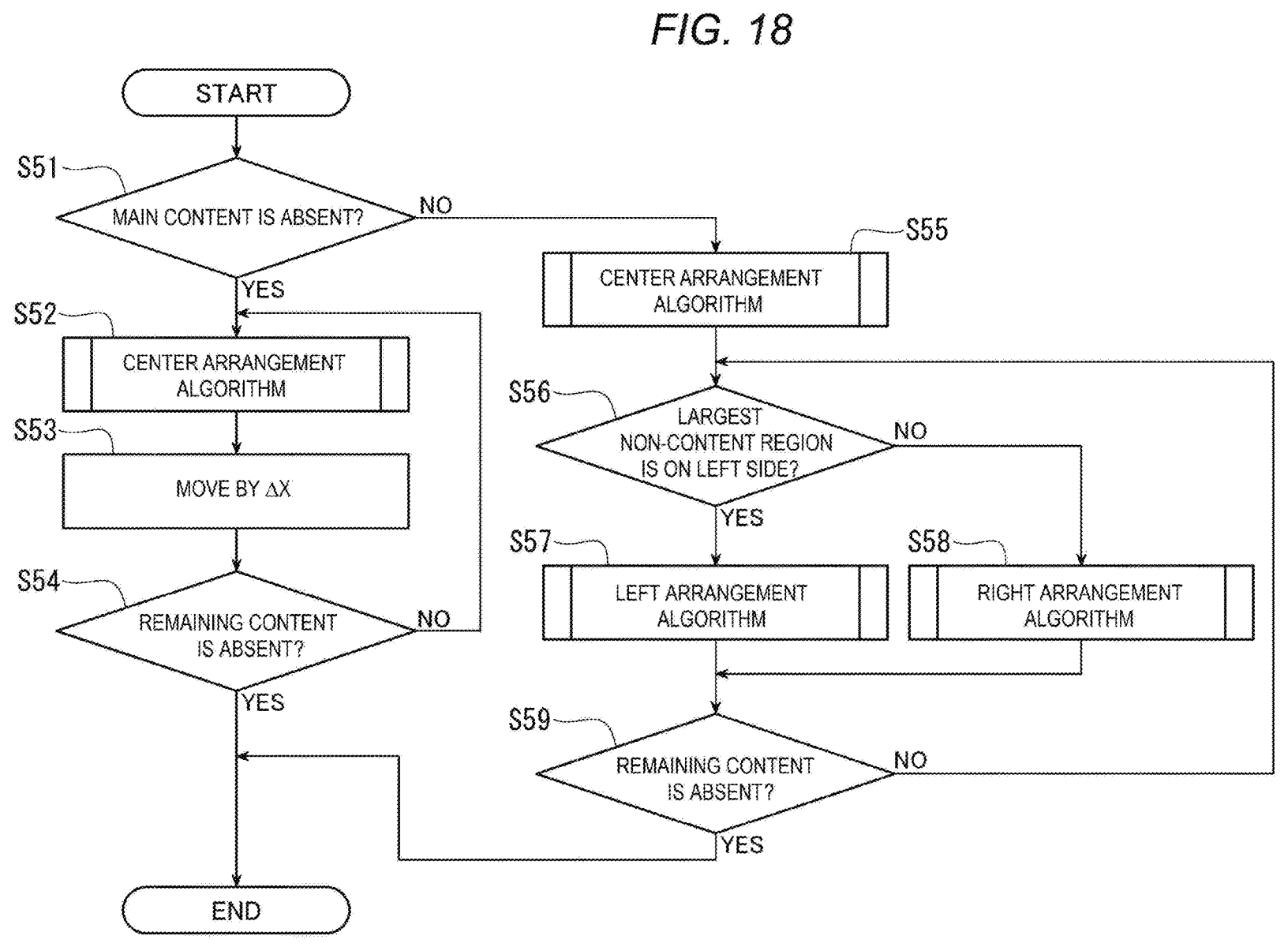

START

S51 MAIN CONTENT IS ABSENT? — NO

YES

S52 CENTER ARRANGEMENT ALGORITHM

S53 MOVE BY ΔX

S54 REMAINING CONTENT IS ABSENT? — NO

YES

S55 CENTER ARRANGEMENT ALGORITHM

S56 LARGEST NON-CONTENT REGION IS ON LEFT SIDE? — NO

YES

S57 LEFT ARRANGEMENT ALGORITHM

S58 RIGHT ARRANGEMENT ALGORITHM

S59 REMAINING CONTENT IS ABSENT? — NO

YES

END

1

DISPLAY METHOD, IMAGE GENERATION DEVICE, AND NON-TRANSITORY COMPUTER-READABLE STORAGE MEDIUM STORING PROGRAM

The present application is based on, and claims priority from JP Application Serial Number 2022-174888, filed Oct. 31, 2022, the disclosure of which is hereby incorporated by reference herein in its entirety.

BACKGROUND

1. Technical Field

The present disclosure relates to a display method, an image generation device and a non-transitory computer-readable storage medium storing program.

2. Related Art

JP-A-2012-247447 (Patent Literature 1) discloses a technique for adjusting, based on a comparison result of a size of a display region set by a user and a size of a video signal input to a projector, size and an aspect ratio of a video projected onto a projection surface from the projector.

In the technique disclosed in Patent Literature 1, since it is not assumed that image content is displayed to be shifted in a predetermined direction in the display region, there is room for improvement from the viewpoint of improving convenience of the user.

SUMMARY

According to an aspect of the present disclosure, there is provided a display method including: acquiring a rectangular first image; and, when a half value of a first size indicating a size on a first axis of a rectangular display region where an image is displayed by one or more display devices is equal to or smaller than a second size indicating a size on the first axis of the first image, the one or more display devices displaying, in the display region, a first display image including the first image arranged in a first position, where a first side orthogonal to the first axis and located on one side of the first axis among four sides of the display region and a third side orthogonal to the first axis and located on the one side among four sides of the first image are in contact, or a second position where a second side opposed to the first side among the four sides of the display region and a fourth side opposed to the third side among the four sides of the first image are in contact.

According to an aspect of the present disclosure, there is provided a display device including a processing device configured to execute: acquiring a rectangular first image; and, when a half value of a first size indicating a size on a first axis of a rectangular display region where an image is displayed by one or more display devices is equal to or smaller than a second size indicating a size on the first axis of the first image, generating a first display image including the first image arranged in a first position, where a first side orthogonal to the first axis and located on one side of the first axis among four sides of the display region and a third side orthogonal to the first axis and located on the one side among four sides of the first image are in contact, or a second position where a second side opposed to the first side among the four sides of the display region and a fourth side opposed to the third side among the four sides of the first image are in contact.

According to an aspect of the present disclosure, there is provided an image generation device including a processing device configured to execute: acquiring a rectangular first image; and, when a half value of a first size indicating a size on a first axis of a rectangular display region where an image is displayed by one or more display devices is equal to or smaller than a second size indicating a size on the first axis of the first image, generating a first display image including the first image arranged in a first position, where a first side orthogonal to the first axis and located on one side of the first axis among four sides of the display region and a third side orthogonal to the first axis and located on the one side among four sides of the first image are in contact, or a second position where a second side opposed to the first side among the four sides of the display region and a fourth side opposed to the third side among the four sides of the first image are in contact.

According to an aspect of the present disclosure, there is provided a non-transitory computer-readable storage medium storing a program, the program causing a computer to execute: acquiring a rectangular first image; and, when a half value of a first size indicating a size on a first axis of a rectangular display region where an image is displayed by one or more display devices is equal to or smaller than a second size indicating a size on the first axis of the first image, generating a first display image including the first image arranged in a first position, where a first side orthogonal to the first axis and located on one side of the first axis among four sides of the display region and a third side orthogonal to the first axis and located on the one side among four sides of the first image are in contact, or a second position where a second side opposed to the first side among the four sides of the display region and a fourth side opposed to the third side among the four sides of the first image are in contact.

BRIEF DESCRIPTION OF THE DRAWINGS

FIG. 8 is a flowchart showing processing of a left arrangement algorithm.

FIG. 11 is a flowchart showing processing of a right arrangement algorithm.

FIG. 17 is a flowchart showing processing of a center arrangement algorithm.

FIG. 18 is a flowchart showing content allocation processing.

DESCRIPTION OF EMBODIMENTS

Embodiments of the present disclosure are explained below with reference to the drawings. In the figures referred to below, scales of members are sometimes differentiated from actual scales in order to show the members in recognizable sizes.

First Embodiment

Figure 1:
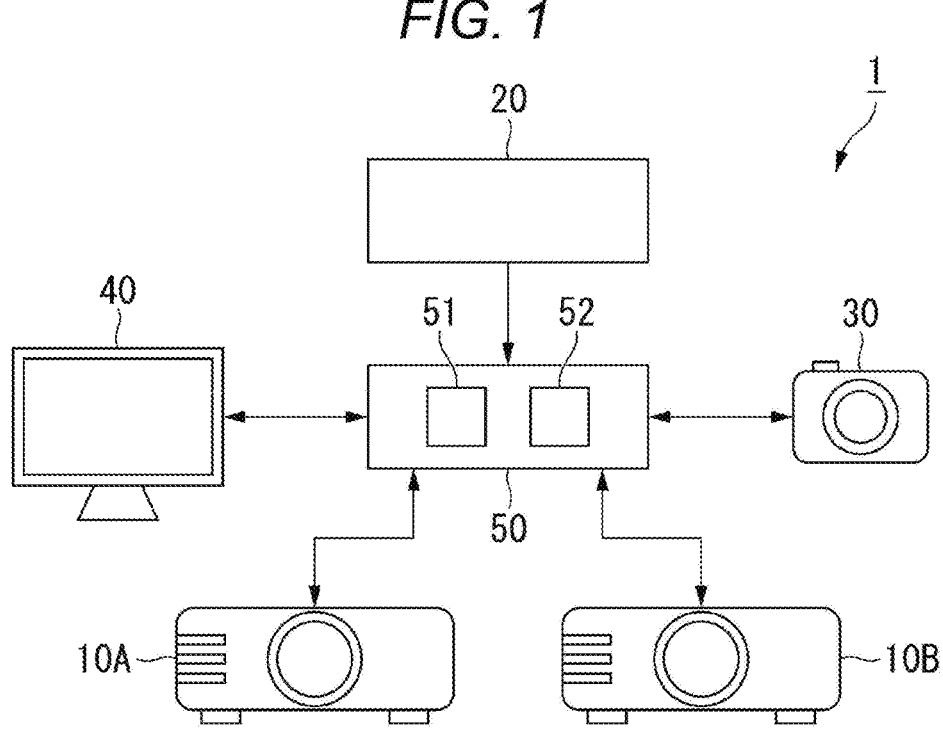
FIG. 1 is a diagram showing a schematic configuration of a projection system in a first embodiment.

First, a first embodiment of the present disclosure is explained. FIG. 1 is a diagram showing a schematic configuration of a projection system 1 in the first embodiment. The projection system 1 is a multi-projection system that displays one image on a projection surface by tiling images projected onto the projection surface from a plurality of projectors. The projection surface may be a dedicated projection screen or may be a surface of an object such as a wall surface.

As an example, the projection system 1 includes two projectors 10A and 10B as display devices. In the following explanation, the projector 10A is sometimes referred to as "first projector 10A" and the projector 10B is sometimes referred to as "second projector 10B". Further, the projection system 1 includes a video supply device 20, a camera 30, an operation monitor 40, and an image generation device 50.

The first projector 10A and the second projector 10B respectively project images onto the projection surface based on a video signal output from the image generation device 50. In the following explanation, among regions on the projection surface, a region where an image is projected by the first projector 10A is sometimes referred to as "first projection region 100A". Among the regions on the projection surface, a region where an image is projected by the second projector 10B is sometimes referred to as "second projection region 100B".

Figure 2:
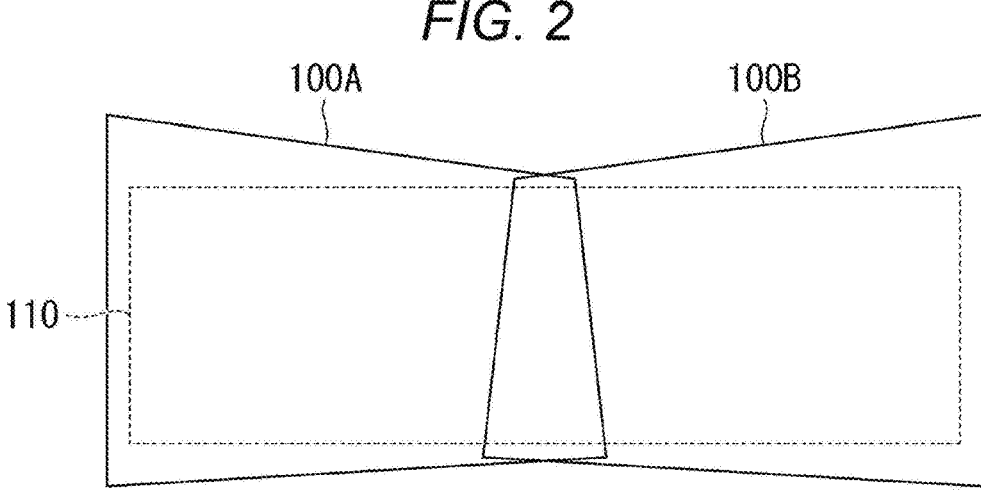
FIG. 2 is a diagram showing an example of a first projection region and a second projection region on a projection surface.

FIG. 2 is a diagram showing an example of the first projection region 100A and the second projection region 100B on the projection surface. As shown in FIG. 2, the first projector 10A and the second projector 10B are disposed side by side in the horizontal direction such that the first projection region 100A and the second projection region 100B partially overlap on the projection surface.

Referring back to FIG. 1, for example, the first projector 10A and the second projector 10B are respectively connected to the image generation device 50 via communication cables such as HDMI (High-Definition Multimedia Interface) cables. The first projector 10A and the second projector 10B may be projectors capable of performing wireless communication with the image generation device 50.

The video supply device 20 supplies a video signal to the image generation device 50. The video supply device 20 is, for example, a personal computer, a DVD (Digital Versatile Disc) player, or a server connected to a network such as a Cloud network. The video supply device 20 may be a storage device such as a hard disk drive in which the video signal is stored. The video signal supplied from the video supply device 20 is transmitted to the image generation device 50 by wired communication or wireless communication. In the following explanation, an image represented by the video signal supplied from the video supply device 20 is sometimes referred to as "video content". That is, the video supply device 20 is also expressed a device that supplies the video content.

The camera 30 is disposed in a position where the first projection region 100A and the second projection region 100B partially overlapping each other are fit within an angle of view. The camera 30 images a scene fit within the angle of view according to an imaging request signal received from the image generation device 50. In the following explanation, an image obtained by the camera 30 performing imaging is sometimes referred to as "captured image". The captured image includes images corresponding to the first projection region 100A and the second projection region 100B. The camera 30 outputs a captured image signal representing the captured image to the image generation device 50.

For example, the camera 30 is connected to the image generation device 50 via a communication cable such as a USB (Universal Serial Bus) cable. The camera 30 may be a camera capable of performing wireless communication with the image generation device 50. Note that, since the camera 30 is a device necessary when calibration explained below is executed, the camera 30 may be disconnected from the image generation device 50 after the calibration ends. The operation monitor 40 has a function of an input device that receives input operation of the user and a function of a display device that displays a GUI (Graphical User Interface) for operation. For example, the operation monitor 40 is a touch panel. The operation monitor 40 outputs an electric signal generated by the operation monitor 40 being operated by the user to the image generation device 50 as an operation signal. The operation monitor 40 displays the GUI for operation based on an image signal output from the image generation device 50.

For example, the operation monitor 40 is connected to the image generation device 50 via a communication cable such as a USB cable. Note that the operation monitor 40 may be a touch panel capable of performing wireless communication with the image generation device 50. The operation monitor 40 may be a touch panel mounted on the image generation device 50.

The image generation device 50 includes at least a processing device 51 and a memory 52. The image generation device 50 incorporates a not-shown circuit board such as a motherboard. The processing device 51 and the memory 52 are disposed on the circuit board. On the circuit board, a not-shown external connection connector disposed to be exposed from a housing of the image generation device 50, a not-shown communication interface circuit electrically connected to the external connection connector, and the like are disposed. On the circuit board, the processing device 51, the memory 52, and the communication interface circuit are electrically connected to one another via a wire such as a bus.

The external connection connector includes a plurality of connectors such as an HDMI connector and a USB connector. As explained above, for example, the first projector 10A, the second projector 10B, the video supply device 20, the camera 30, and the operation monitor 40 are connected to the external connection connector of the image generation device 50 via a communication cable such as an HDMI cable or a USB cable. When the first projector 10A, the second projector 10B, the video supply device 20, the camera 30, and the operation monitor 40 are capable of performing wireless communication with the image generation device 50, a wireless communication circuit may be disposed on the circuit board.

The processing device 51 is a processor that executes various kinds of processing according to programs stored in advance in the memory 52. For example, the processing device 51 is configured by a single or a plurality of CPUs (Central Processing Units). A part or all of functions of the processing device 51 may be configured by circuits such as a DSP (Digital Signal Processor), an ASIC (Application Specific Integrated Circuit), a PLD (Programmable Logic Device), and an FPGA (Field Programmable Gate Array). The processing device 51 executes the various kinds of processing in parallel or sequentially.

The processing device 51 communicates with the first projector 10A, the second projector 10B, the video supply device 20, the camera 30, and the operation monitor 40 via the communication interface circuit. For example, the processing device 51 receives, via the communication interface circuit, the video signal supplied from the video supply device 20, the captured image signal output from the camera 30, and the operation signal output from the operation monitor 40.

For example, the processing device 51 outputs a video signal to each of the first projector 10A and the second projector 10B, outputs an imaging request signal to the camera 30, and outputs an image signal to the operation monitor 40 via the communication interface circuit. Note that, in the following explanation, the video signal supplied from the video supply device 20 is sometimes referred to as "original video signal", the video signal output from the processing device 51 to the first projector 10A is sometimes referred to as "first video signal", and the video signal output from the processing device 51 to the second projector 10B is sometimes referred to as "second video signal".

The memory 52 includes a nonvolatile memory that stores programs, various setting data, and the like necessary to cause the processing device 51 to executes various kinds of processing and a volatile memory used as a temporary storage destination for data when the processing device 51 executes the various kinds of processing. The nonvolatile memory is, for example, an EEPROM (Electrically Erasable Programmable Read-Only Memory), a ROM (Read Only Memory), or a flash memory. The volatile memory is, for example, a RAM (Random Access Memory).

In the following explanation, the various kinds of processing to be executed by the processing device 51 according to the programs stored in the memory 52 are explained.

Calibration

As explained above, the first projector 10A and the second projector 10B are disposed side by side in the horizontal direction such that the first projection region 100A and the second projection region 100B partially overlap on the projection surface. When the projection surface is viewed from the front after the first projector 10A and the second projector 10B are disposed as explained above, as shown in FIG. 2, the first projection region 100A and the second projection region 100B respectively often do not become rectangular regions because of, for example, a three-dimensional shape of the projection surface and fluctuation in directions of the first projector 10A and the second projector 10B with respect to the projection surface.

In this case, in a state in which the camera 30 is disposed in the position where the first projection region 100A and the second projection region 100B partially overlapping each other are fit within the angle of view, the user operates the GUI for operation displayed on the operation monitor 40 to thereby input a start instruction for calibration. When the processing device 5 receives the start instruction for the calibration based on an operation signal input from the operation monitor 40, the processing device 51 starts the calibration by reading a program of a calibration application from the memory 52 and executing the program.

After starting the calibration, while causing each of the first projector 10A and the second projector 10B to project a lattice pattern image, the processing device 51 outputs an imaging request signal to the camera 30 to thereby request the camera 30 to image a scene within the angle of view. The camera 30 images the scene within the angle of view according to the request of the processing device 51 and outputs a captured image signal representing a captured image including the lattice pattern image to the processing device 51.

The processing device 51 performs image processing for the captured image based on the captured image signal input from the camera 30 to thereby calculate a geometrical relation between the camera 30 and a panel. The panel is, for example, a liquid crystal panel mounted on each of the first projector 10A and the second projector 10B. In the following explanation, the panel of the first projector 10A is sometimes referred to as "first panel" and the panel of the second projector 10B is sometimes referred to as "second panel". The geometrical relation between the camera 30 and the panel is individually calculated for each of the first panel and the second panel.

As shown in FIG. 2, the processing device 51 calculates, based on the geometrical relation between the camera 30 and the panel, as a screen area 110, a largest rectangular region fit within the inner side of both of the first projection region 100A and the second projection region 100B. The processing device 51 calculates, based on coordinates of the four vertexes of the screen area 110 in a camera image coordinate system and the geometrical relation between the camera 30 and the panel, an all pixel correspondence map indicating a correspondence relation between coordinates of pixels of the panel in a panel image coordinate system and coordinates of pixels of an input image in an input image coordinate system.

In the following explanation, the all pixel correspondence map calculated for the first panel is sometimes referred to as "first all pixel correspondence map" and the all pixel correspondence map calculated for the second panel is sometimes referred to as "second all pixel correspondence map". The input image is an image, that is, video content represented by the original video signal supplied from the video supply device 20 to the image generation device 50.

The processing device 51 generates a first panel image by determining pixel values of pixels of the first panel based on pixel values of the pixels of the input image and the first all pixel correspondence map. The processing device 51 generates a second panel image by determining pixel values of pixels of the second panel based on pixel values of the pixels of the input image and the second all pixel correspondence map. The processing device 51 outputs a first video image representing the first panel image to the first projector 10A and outputs a second video signal representing the second panel image to the second projector 10B.

Consequently, a rectangular first projection image corresponding to the first panel image is projected onto the projection surface from the first projector 10A and a rectangular second projection image corresponding to the second panel image is projected onto the projection surface from the second projector 10B. As a result, the first projection image and the second projection image are tiled in the screen area 110 on the projection surface, whereby one rectangular image corresponding to the input image is displayed over the entire screen area 110.

As explained above, if the all pixel correspondence map is present, the first image projected from the first projector 10A and the second image projected from the second projector 10B can be superimposed. However, brightness of a region where the first image and the second image overlap is larger compared with other regions. Therefore, at the execution time of the calibration, for the purpose of uniformizing brightness of the regions in the screen area 110 including the region where the first image and the second image overlap, the processing device 51 calculates a blend map that defines brightness for each of the pixels of the panel.

The blend map is calculated individually for each of the first panel and the second panel. In the following explanation, the blend map calculated for the first panel is sometimes referred to as "first blend map" and the blend map calculated for the second panel is sometimes referred to as "second blend map".

As explained above, the processing device 51 executes the calibration to thereby acquire the coordinates of the four vertexes of the screen area 110, the size of the screen area 110, the all pixel correspondence maps for each of the panels, and the blend maps for each of the panels. The size of the screen area 110 is calculated from the coordinates of the four vertexes of the screen area 110. The processing device 51 stores kinds of information obtained by the calibration in the memory 52.

As it is understood from the above explanation, the screen area 110 corresponds to "a rectangular display region where an image is displayed by one or more display devices". Note that the calibration explained above is processing generally known in the multi-projection system. Therefore, explanation concerning methods of calculating the geometrical relation between the camera 30 and the panel, the all pixel correspondence maps, the blend maps, and the like is omitted.

Left Arrangement Algorithm

As explained above, in general, the first projection image and the second projection image are tiled in the screen area 110 on the projection surface, whereby one rectangular image corresponding to the input image, that is, the video content is displayed over the entire screen area 110. In the following explanation, a left arrangement algorithm for arranging video content supplied from the video supply device 20 in a position on the left side in the screen area 110 is explained. The processing device 51 executes the left arrangement algorithm according to a program stored in the memory 52.

First, the processing device 51 acquires, as input information, a size of the screen area 110 in the camera image coordinate system and a size of an input image 120 in the input image coordinate system. In the following explanation, the camera image coordinate system is sometimes referred to as "target coordinate system", the input image coordinate system is sometimes referred to as "content coordinate system", and the input image 120 is sometimes referred to as "content 120".

Figure 3:
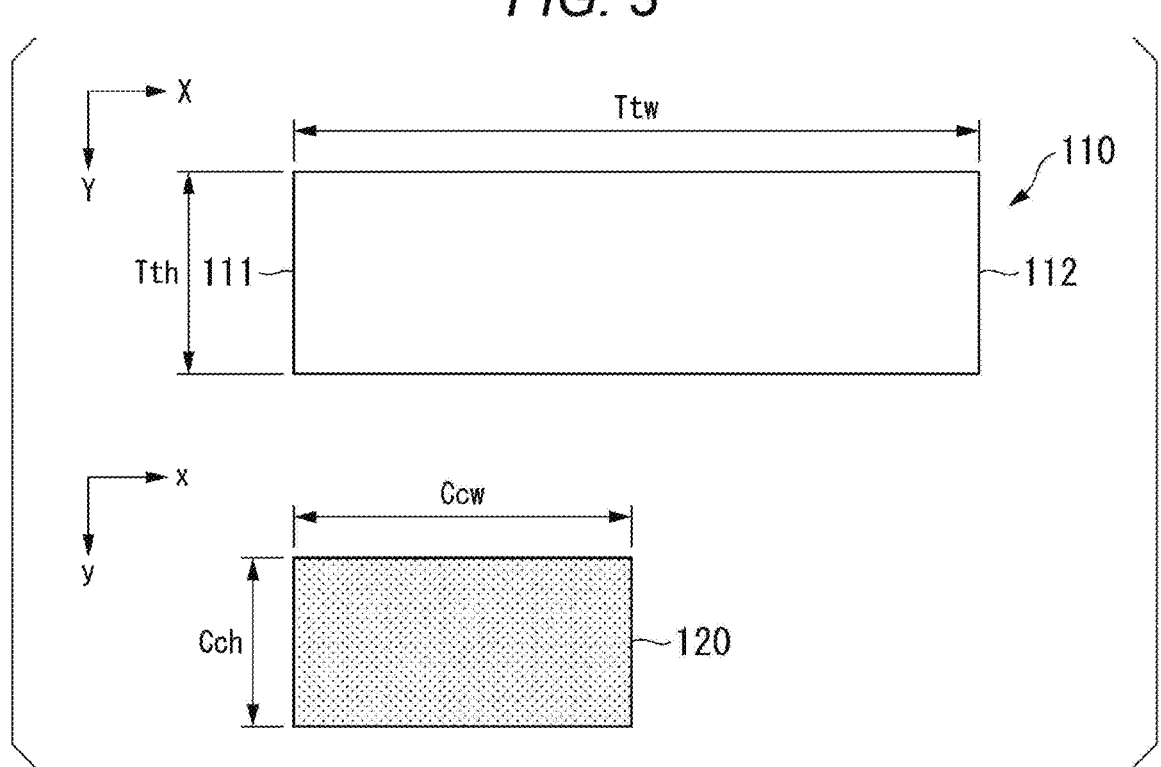
FIG. 3 is a diagram showing an example of a size of a screen area in a target coordinate system and a size of content in a content coordinate system.

FIG. 3 is a diagram showing an example of a size of the screen area 110 in the target coordinate system and a size of the content 120 in the content coordinate system. In FIG. 3, an X axis and a Y axis orthogonal to the X axis are appended as coordinate axes representing the target coordinate system and x axis and a y axis orthogonal to the x axis are appended as coordinate axes representing the content coordinate system. Directions pointed by arrows of the axes are represented as +directions and directions opposite to the +directions are represented as −directions. Note that, in the following explanation, the +X direction and the +x direction are sometimes referred to as right direction and the −X direction and the −x direction are sometimes referred to as left direction. In the following explanation, the +Y direction and the +y direction are sometimes referred to as downward direction and the −Y direction and the −y direction are sometimes referred to as upward direction.

The processing device 51 acquires, as the size of the screen area 110, width Ttw of the screen area 110 and height Tth of the screen area 110. As shown in FIG. 3, the width Ttw of the screen area 110 is a size on the X axis of the screen area 110 and the height Tth of the screen area 110 is a size on the Y axis of the screen area 110.

In the following explanation, among the four sides of the screen area 110, a side orthogonal to the X axis and located on the left side is sometimes referred to as left side 111 and a side orthogonal to the X axis and located on the right side is sometimes referred to as right side 112. Among the four vertexes of the screen area 110, a vertex located on the upper left is the origin of the target coordinate system.

As it is understood from the above explanation, the width Ttw of the screen area 110 corresponds to "a first size indicating a size on a first axis of a display region". The left side 111 of the screen area 110 corresponds to "a first side orthogonal to the first axis and located on one side of the first axis among four sides of the display region". The right side 112 of the screen area 110 corresponds to "a second side opposed to the first side among the four sides of the display region".

The processing device 51 acquires, as the size of the content 120, width Ccw of the content 120 and height Cch of the content 120. As shown in FIG. 3, the width Ccw of the content 120 is a size on the x axis of the content 120 and the height Cch of the content 120 is a size on the y axis of the content 120. Among the four vertexes of the content 120, a vertex located on the upper left is the origin of the content coordinate system. In this embodiment, an aspect ratio RCc of the content 120 is defined by the following Expression (1).

$$RCc=Ccw/Cch \tag{1}$$

Subsequently, the processing device 51 calculates a size of content 130 in the target coordinate system based on the size of the screen area 110 in the target coordinate system and the size of the content 120 in the content coordinate system. Specifically, the processing device 51 calculates width Ctw of the content 130 based on the following Expression (2) and calculates height Cth of the content 130 based on the following Expression (3). An aspect ratio of the content 130 in the target coordinate system coincides with the aspect ratio RCc of the content 120 in the content coordinate system.

$$Ctw=Tth\times RCc=Tth\times Ccw/Cch \qquad (2)$$

$$Cth=Tth \qquad (3)$$

As it is understood from the above explanation, the height Cch of the content 120 in the content coordinate system corresponds to "a third size indicating a size of a rectangular second image on a second axis orthogonal to the first axis". The height Tth of the screen area 110 in the target coordinate system corresponds to "a fourth size indicating a size on the second axis of the display region".

Figure 4:
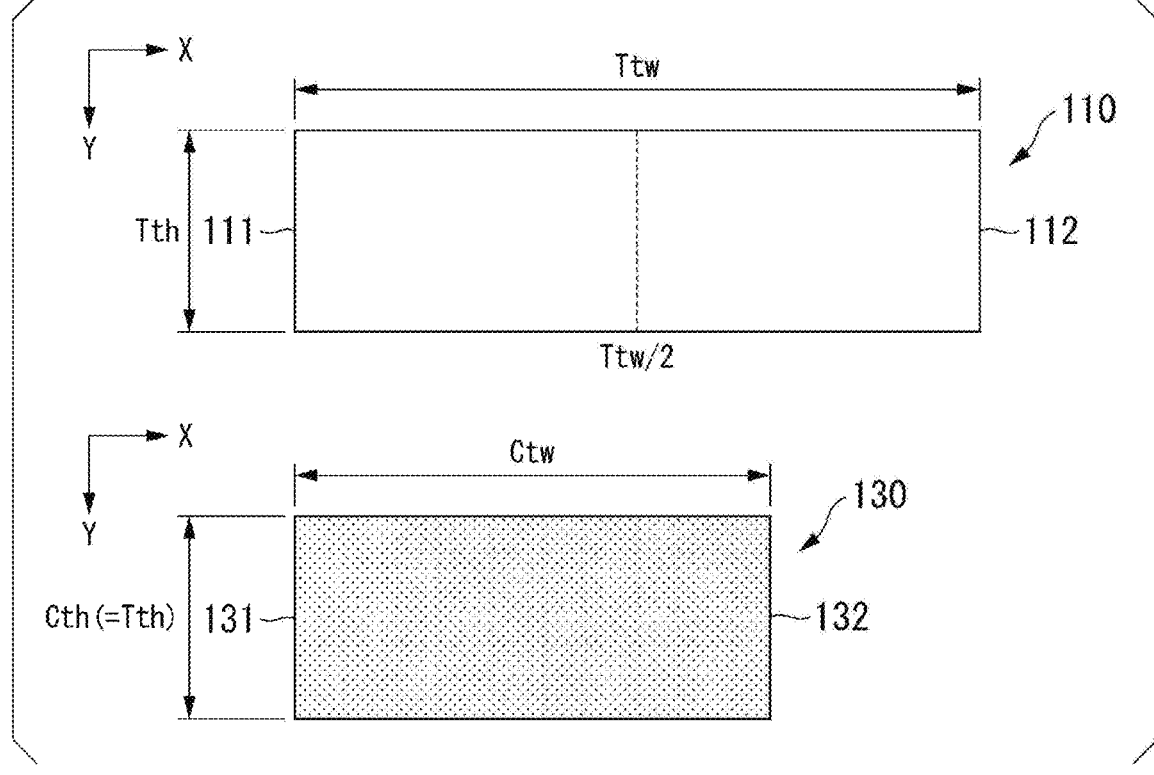
FIG. 4 is a diagram showing an example of the size of the screen area in the target coordinate system and a size of content in the target coordinate system.

FIG. 4 is a diagram showing an example of the size of the screen area 110 in the target coordinate system and the size of the content 130 in the target coordinate system. As shown in FIG. 4, the width Ctw of the content 130 is a size on the X axis of the content 130 and the height Cth of the content 130 is a size on the Y axis of the content 130. In the following explanation, among the four sides of the content 130, a side orthogonal to the X axis and located on the left side is sometimes referred to as left side 131 and a side orthogonal to the X axis and located on the right side is sometimes referred to as right side 132.

As it is understood from the above explanation, the width Ctw of the content 130 corresponds to "a second size indicating a size on the first axis of the first image". The left side 131 of the content 130 corresponds to "a third side orthogonal to the first axis and located on the one side of the first axis among four sides of the first image". The right side 132 of the content 130 corresponds to "a fourth side orthogonal to the third side among the four sides of the first image". The width Ttw of the screen area 110 is larger than the width Ctw of the content 130.

FIG. 4 shows an example of a case in which a half value of the width Ttw of the screen area 110, that is, Ttw/2 is equal to or smaller than the width Ctw of the content 130. When the half value of the width Ttw of the screen area 110 is equal to or smaller than the width Ctw of the content 130, the processing device 51 arranges the content 130 in a first position where the left side 111 of the screen area 110 and the left side 131 of the content 130 are in contact among the regions in the screen area 110. In other words, when Ttw/2Tth×Ccw/Cch is satisfied, the processing device 51 arranges the content 130 in the first position in the screen area 110.

Note that the half value of the width Ttw of the screen area 110 does not always need to completely coincide with Ttw/2 and may be a value included in a range of Ttw/2±α. As an example, α is an integer equal to larger than 1 and equal to or smaller than 5. A value of a may be a preset value or may be set by the user operating the operation monitor 40.

Figure 5:
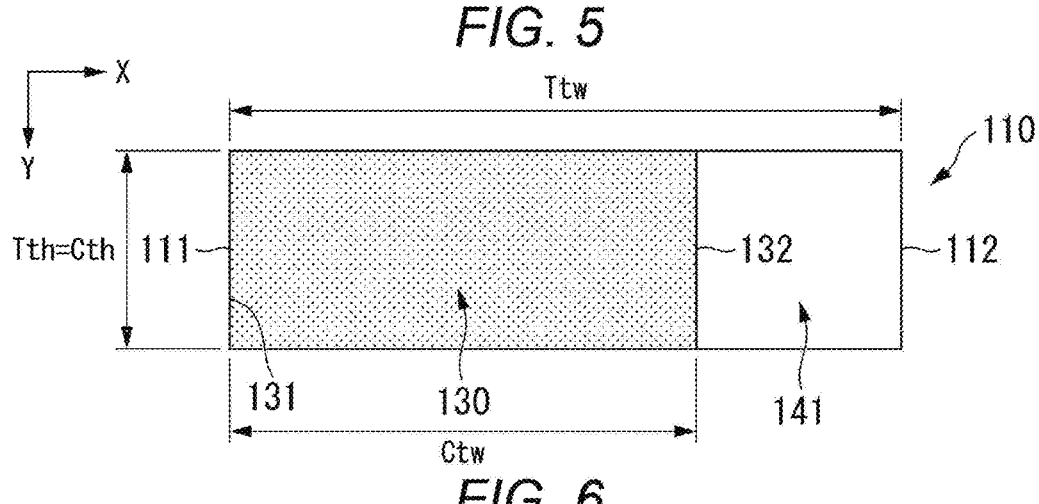
FIG. 5 is a diagram showing a state in which the content in the target coordinate system is arranged in a first position in the screen area.

FIG. 5 is a diagram showing a state in which the content 130 is arranged in the first position in the screen area 110. The processing device 51 acquires coordinates of the four vertexes of the content 130 arranged in the first position in the screen area 110. A coordinate of the upper left vertex of the content 130 is (0, 0). A coordinate of the upper right vertex of the content 130 is (Ctw−1, 0). A coordinate of the lower left vertex of the content 130 is (0, Tth−1). A coordinate of the lower right vertex of the content 130 is (Ctw−1, Tth−1).

The processing device 51 acquires coordinates of the four vertexes of a non-content region 141 in the screen area 110. As shown in FIG. 5, the non-content region 141 is a region other than the content 130 arranged in the first position among the regions in the screen area 110. A coordinate of the upper left vertex of the non-content region 141 is (Ctw, 0). A coordinate of the upper right vertex of the non-content region 141 is (Ttw−1, 0). A coordinate of the lower left vertex of the non-content region 141 is (Ctw, Tth−1). A coordinate of the lower right vertex of the non-content region 141 is (Ttw−1, Tth−1).

Figure 6:
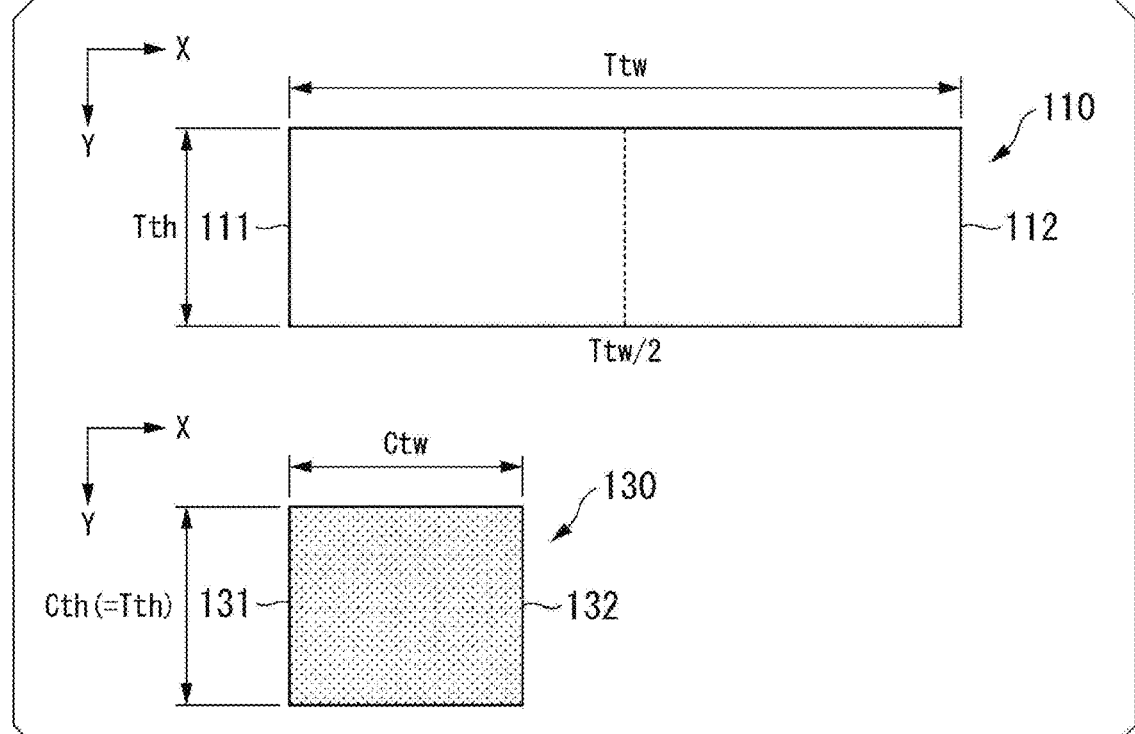
FIG. 6 is a diagram showing an example of a case in which a half value of width of the screen area is larger than width of the content in the target coordinate system.

The processing device 51 acquires, as output information, coordinates of the four vertexes of the content 130 arranged in the first position in the screen area 110, coordinates of the four vertexes of the non-content region 141, the number of non-content regions 141, and a size of the non-content region 141. As explained above, when the content 130 is arranged in the first position in the screen area 110, the number of non-content regions 141 is one. In the size of the non-content region 141, the width of the non-content region 141 is equal to Ttw-Ctw and the height of the non-content region 141 is equal to Tth FIG. 6 is a diagram showing an example in which a half value of the width Ttw of the screen area 110, that is, Ttw/2 is larger than the width Ctw of the content 130. As shown in FIG. 6, when the half value of the width Ttw of the screen area 110 is larger than the width Ctw of the content 130, the processing device 51 arranges the content 130 in a third position where the right side 132 of the content 130 passes a center point Pc of the screen area 110 among the regions in the screen area 110. In other words, when Ttw/2>Tth× Ccw/Cch is satisfied, the processing device 51 arranges the content 130 in the third position in the screen area 110.

Note that the right side 132 of the content 130 does not always need to pass the center point Pc of the screen area 110 and may pass a circular region having a radius β centering on the center point Pc. As an example, the radius β is an integer equal to or larger than 1 and equal to or smaller than 5. A value of the radius β may be a value set in advance or may be set by the user operating the operation monitor 40.

Figure 7:
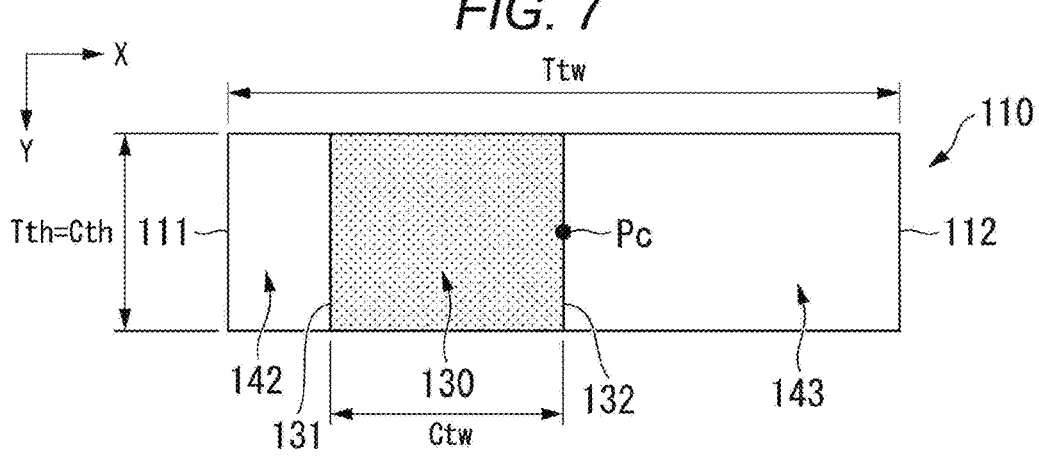
FIG. 7 is a diagram showing a state in which the content in the target coordinate system is arranged in a third position in the screen area.

FIG. 7 is a diagram showing a state in which the content 130 is arranged in the third position in the screen area 110. The processing device 51 acquires coordinates of the four vertexes of the content 130 arranged in the third position in the screen area 110. A coordinate of the upper left vertex of the content 130 is (Left, 0). Here, Left=Ttw/2−1−Ctw. A coordinate of the upper right vertex of the content 130 is (Right, 0). Here, Right=Ttw/2−1. A coordinate of the lower left vertex of the content 130 is (Left, Tth−1). A coordinate of the lower right vertex of the content 130 is (Right, Tth−1).

The processing device 51 acquires coordinates of the four vertexes of each of non-content regions 142 and 143 in the screen area 110. As shown in FIG. 7, the non-content regions 142 and 143 are regions other than the content 130 arranged in the third position among the regions in the screen area 110. A coordinate of the upper left vertex of the non-content region 142 is (0, 0). A coordinate of the upper right vertex of the non-content region 142 is (Left−1, 0). A coordinate of the lower left vertex of the non-content region 142 is (0, Tth−1). A coordinate of the lower right vertex of the non-content region 142 is (Left−1, Tth−1).

A coordinate of the upper left vertex of the non-content region 143 is (Right+1, 0). A coordinate of the upper right vertex of the non-content region 143 is (Ttw−1, 0). A coordinate of the lower left vertex of the non-content region 143 is (Right+1, Tth−1). A coordinate of the lower right vertex of the non-content region 143 is (Ttw−1, Tth−1).

The processing device 51 acquires, as output information, coordinates of the four vertexes of the content 130 arranged in the third position in the screen area 110, coordinates of the four vertexes of each of the non-content regions 142 and 143, the number of non-content regions 142 and 143, and sizes of the non-content regions 142 and 143.

When the content 130 is arranged in the third position in the screen area 110 as explained above, the number of the non-content regions 142 and 143 is two. In the size of the non-content region 142, the width of the non-content region 142 is equal to Left and the height of the non-content region 142 is equal to Tth. In the size of the non-content region 143, the width of the non-content region 143 is equal to Ttw/2 and the height of the non-content region 143 is equal to Tth.

The left arrangement algorithm is as explained above.

The processing device 51 generates a first panel image by determining pixel values of the pixels of the first panel based on the output information obtained by executing the left arrangement algorithm, the pixel values of the pixels of the input image (the video content), the first all pixel correspondence map, and the first blend map. The processing device 51 generates a second panel image by determining pixel values of the pixels of the second panel based on the output information obtained by executing the left arrangement algorithm, the pixel values of the pixels of the input image (the video content), the second all pixel correspondence map, and the second blend map. The processing device 51 outputs a first video signal representing the first panel image to the first projector 10A and outputs a second video signal representing the second panel image to the second projector 10B.

Consequently, a rectangular first projection image corresponding to the first panel image is projected onto the projection surface from the first projector 10A and a rectangular second projection image corresponding to the second panel image is projected onto the projection surface from the second projector 10B. As a result, the first projection image and the second projection image are tiled in the screen area 110 on the projection surface, whereby a first display image including video content arranged in the first position in the screen area 110 and a second display image including video content arranged in the third position in the screen area 110 are displayed in the screen area 110.

Note that, in the case of a first mode, the processing device 51 may cause the first projector 10A and the second projector 10B to display the first display image including the video content arranged in the first position. The first mode may be set by the user operating the operation monitor 40.

FIG. 8 is a flowchart showing processing of the left arrangement algorithm. In the following explanation concerning FIG. 8, redundant explanation concerning the left arrangement algorithm explained above is omitted or simplified.

As shown in FIG. 8, when starting execution of the left arrangement algorithm, first, the processing device 51 acquires a size of the screen area 110 in the target coordinate system as input information (step S11). In step S11, the processing device 51 acquires the width Ttw of the screen area 110 and the height Tth of the screen area 110 as the size of the screen area 110.

Subsequently, the processing device 51 acquires a size of the content 120 in the content coordinate system as input information (step S12). In step S12, the processing device 51 acquires the width Ccw of the content 120 and the height Cch of the content 120 as the size of the content 120.

Subsequently, the processing device 51 calculates a size of the content 130 in the target coordinate system based on the size of the screen area 110 in the target coordinate system and the size of the content 120 in the content coordinate system (step S13). In step S13, the processing device 51 calculates the width Ctw of the content 130 based on the above Expression (2) and calculates the height Cth of the content 130 based on the above Expression (3).

Subsequently, the processing device 51 determines whether a half value of the width Ttw of the screen area 110 is equal to or smaller than the width Ctw of the content 130 (step S14). When determining that the half value of the width Ttw of the screen area 110 is equal to or smaller than the width Ctw of the content 130 (YES in step S14), the processing device 51 arranges the content 130 in the first position in the screen area 110 and acquires coordinates of the four vertexes of the content 130 and coordinates of the four vertexes of the non-content region 141 (step S15).

On the other hand, when determining that the half value of the width Ttw of the screen area 110 is larger than the width Ctw of the content 130 (NO in step S14), the processing device 51 arranges the content 130 in the third position in the screen area 110 and acquires coordinates of the four vertexes of the content 130 and coordinates of the four vertexes of each of the non-content regions 142 and 143 (step S16).

After executing the processing in steps S15 or S16 explained above, the processing device 51 acquires output information (step S17). When shifting to step S17 after step S15, the processing device 51 acquires, as the output information, coordinates of the four vertexes of the content 130 arranged in the first position in the screen area 110, coordinates of the four vertexes of the non-content region 141, the number of non-content regions 141, and a size of the non-content region 141.

When shifting to step S17 after step S16, the processing device 51 acquires, as the output information, coordinates of the four vertexes of the content 130 arranged in the third position in the screen area 110, coordinates of the four vertexes of each of the non-content regions 142 and 143, the number of non-content regions 142 and 143, and sizes of the non-content regions 142 and 143. After executing step S17, the processing device 51 ends the processing of the left arrangement algorithm.

Right Arrangement Algorithm

In the following explanation, a right arrangement algorithm for arranging video content supplied from the video supply device 20 in a position on the right side in the screen area 110 is explained. The processing device 51 executes the right arrangement algorithm according to a program stored in the memory 52.

First, the processing device 51 acquires, as input information, a size of the screen area 110 in the target coordinate system and a size of the content 120 in the content coordinate system. Since this processing is the same as the processing of the left arrangement algorithm, explanation is omitted.

Subsequently, the processing device 51 calculates a size of the content 130 in the target coordinate system based on the size of the screen area 110 in the target coordinate system and the size of the content 120 in the content coordinate system. Specifically, the processing device 51 calculates the width Ctw of the content 130 based on the above Expression (2) and calculates the height Cth of the content 130 based on the above Expression (3).

Figure 9:
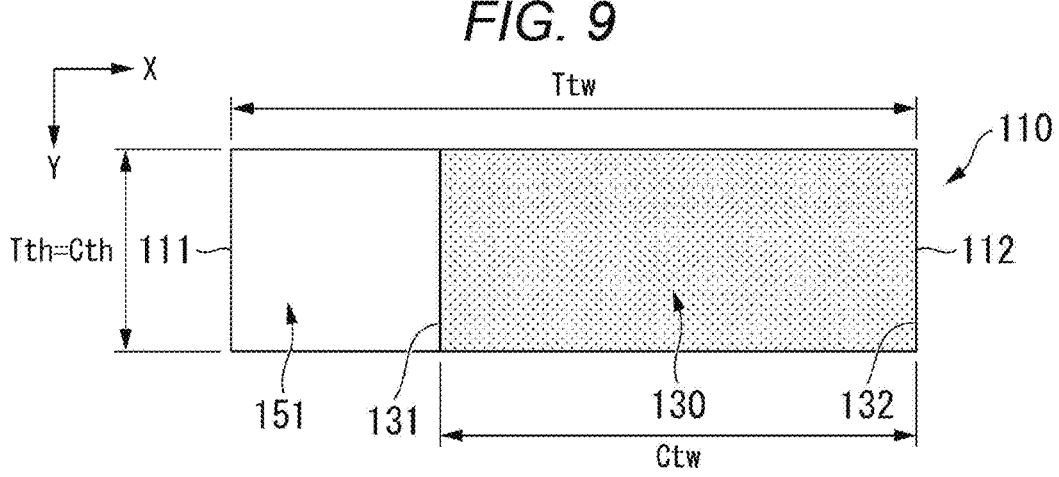
FIG. 9 is a diagram showing a state in which the content in the target coordinate system is arranged in a second position in the screen area.

As shown in FIG. 9, when the half value of the width Ttw of the screen area 110 is equal to or smaller than the width Ctw of the content 130, the processing device 51 arranges the content 130 in the second position where the right side 112 of the screen area 110 and the right side 132 of the content 130 are in contact among the regions in the screen area 110. In other words, when $Ttw/2 \leq Tth \times Ccw/Cch$ is satisfied, the processing device 51 arranges the content 130 in the second position in the screen area 110.

Note that, as in the left arrangement algorithm, in the right arrangement algorithm, the half value of the width Ttw of the screen area 110 does not always need to completely coincide with $Ttw/2$ and may be a value included within a range of $Ttw/2 \pm \alpha$. As an example, $\alpha$ is an integer equal to or larger than 1 and equal to or smaller than 5. A value of $\alpha$ may be a preset value or may be set by the user operating the operation monitor 40.

FIG. 9 is a diagram showing a state in which the content 130 is arranged in the second position in the screen area 110. The processing device 51 acquires coordinates of the four vertexes of the content 130 arranged in the second position in the screen area 110. A coordinate of the upper left vertex of the content 130 is (Left, 0). Here, Left=Ttw-Ctw-1. A coordinate of the upper right vertex of the content 130 is (Ttw-1, 0). A coordinate of the lower left vertex of the content 130 is (Left, Tth-1). A coordinate of the lower right vertex of the content 130 is (Ttw-1, Tth-1).

The processing device 51 acquires coordinates of the four vertexes of a non-content region 151 in the screen area 110. As shown in FIG. 9, the non-content region 151 is a region other than the content 130 arranged in the second region among the regions in the screen area 110. A coordinate of the upper left vertex of the non-content region 151 is (0, 0). A coordinate of the upper right vertex of the non-content region 151 is (Left-1, 0). A coordinate of the lower left vertex of the non-content region 151 is (0, Tth-1). A coordinate of the lower right vertex of the non-content region 151 is (Left-1, Tth-1).

The processing device 51 acquires, as output information, coordinates of the four vertexes of the content 130 arranged in the second position in the screen area 110, coordinates of the four vertexes of the non-content region 151, the number of non-content regions 151, and a size of the non-content region 151. As explained above, when the content 130 is arranged in the second position in the screen area 110, the number of non-content regions 151 is one. In the size of the non-content region 151, the width of the non-content region 151 is equal to Ttw-Ctw and the height of the non-content region 151 is equal to Tth.

Figure 10:
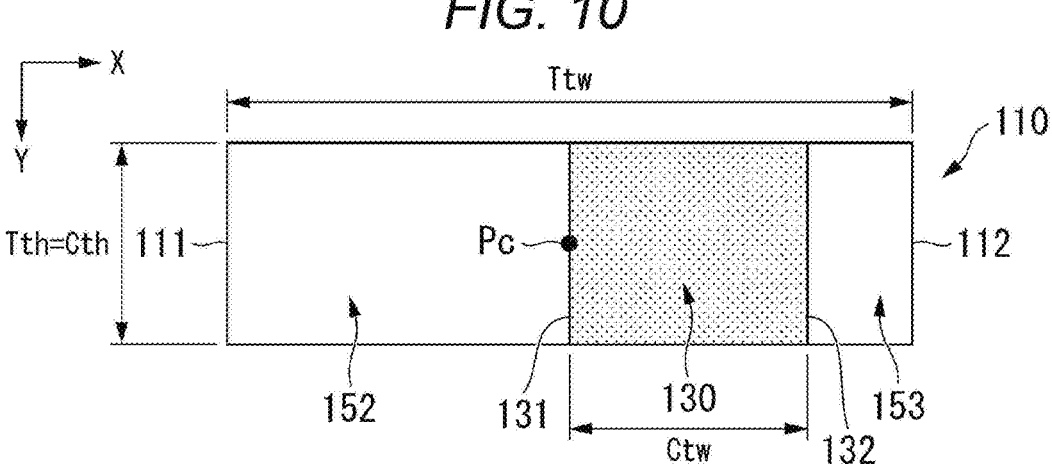
FIG. 10 is a diagram showing a state in which the content in the target coordinate system is arranged in a fourth position in the screen area.

As shown in FIG. 10, when a half value of the width Ttw of the screen area 110 is larger than the width Ctw of the content 130, the processing device 51 arranges the content 130 in a fourth position where the left side 131 of the content 130 passes the center point Pc of the screen area 110 among the regions in the screen area 110. In other words, when $Ttw/2 > Tth \times Ccw/Cch$ is satisfied, the processing device 51 arranges the content 130 in the fourth position in the screen area 110.

FIG. 10 is a diagram showing a state in which the content 130 is arranged in the fourth position in the screen area 110. The processing device 51 acquires coordinates of the four vertexes of the content 130 arranged in the fourth position in the screen area 110. A coordinate of the upper left vertex of the content 130 is (Left, 0). Here, Left=Ttw/2+1. A coordinate of the upper right vertex of the content 130 is (Right, 0). Here, Right=Left+Ctw. A coordinate of the lower left vertex of the content 130 is (Left, Tth-1). A coordinate of the lower right vertex of the content 130 is (Right, Tth-1).

The processing device 51 acquires coordinates of the four vertexes of each of non-content regions 152 and 153 in the screen area 110. As shown in FIG. 10, the non-content regions 152 and 153 are regions other than the content 130 arranged in the fourth position among the regions in the screen area 110. A coordinate of the upper left vertex of the non-content region 152 is (0, 0). A coordinate of the upper right vertex of the non-content region 152 is (Left-1, 0). A coordinate of the lower left vertex of the non-content region 152 is (0, Tth-1). A coordinate of the lower right vertex of the non-content region 152 is (Left-1, Tth-1).

A coordinate of the upper left vertex of the non-content region 153 is (Right+1, 0). A coordinate of the upper right vertex of the non-content region 153 is (Ttw-1, 0). A coordinate of the lower left vertex of the non-content region 153 is (Right+1, Tth-1). A coordinate of the lower right vertex of the non-content region 153 is (Ttw-1, Tth-1).

The processing device 51 acquires, as output information, coordinates of the four vertexes of the content 130 arranged in the fourth position in the screen area 110, coordinates of the four vertexes of each of the non-content regions 152 and 153, the number of non-content regions 152 and 153, and sizes of the non-content regions 152 and 153.

When the content 130 is arranged in the fourth position in the screen area 110 as explained above, the number of non-content regions 152 and 153 is two. In the size of the non-content region 152, the width of the non-content region 152 is equal to Ttw/2 and the height of the non-content region 152 is equal to Tth. In the size of the non-content region 153, the width of the non-content region 153 is equal to Ttw-Right+1 and the height of the non-content region 153 is equal to Tth.

The right arrangement algorithm is as explained above.

The processing device 51 generates a first panel image by determining pixel values of the pixels of the first panel based on the output information obtained by executing the right arrangement algorithm, the pixel values of the pixels of the input image (the video content), the first all pixel correspondence map, and the first blend map. The processing device 51 generates a second panel image by determining pixel values of the pixels of the second panel based on the output information obtained by executing the right arrangement algorithm, the pixel values of the pixels of the input image (the video content), the second all pixel correspondence map, and the second blend map. The processing device 51 outputs a first video signal representing the first panel image to the first projector 10A and outputs a second video signal representing the second panel image to the second projector 10B.

Consequently, a rectangular first projection image corresponding to the first panel image is projected onto the projection surface from the first projector 10A and a rectangular second projection image corresponding to the second panel image is projected onto the projection surface from the second projector 10B. As a result, the first projection image and the second projection image are tiled in the screen area 110 on the projection surface, whereby a first display image including video content arranged in the second position in the screen area 110 and a second display image including video content arranged in the fourth position in the screen area 110 are displayed in the screen area 110.

Note that, in the case of a second mode, the processing device 51 may cause the first projector 10A and the second projector 10B to display the first display image including the video content arranged in the second position. The second mode may be set by the user operating the operation monitor 40.

FIG. 11 is a flowchart showing processing of the right arrangement algorithm. In the following explanation concerning FIG. 11, redundant explanation concerning the right arrangement algorithm explained above is omitted or simplified.

As shown in FIG. 11, when starting execution of the right arrangement algorithm, first, the processing device 51 acquires a size of the screen area 110 in the target coordinate system as input information (step S21). The processing in step S21 is the same as the processing in step S11 shown in FIG. 8.

Subsequently, the processing device 51 acquires a size of the content 120 in the content coordinate system as input information (step S22). The processing in step S22 is the same as the processing in step S12 shown in FIG. 8.

Subsequently, the processing device 51 calculates a size of the content 130 in the target coordinate system based on the size of the screen area 110 in the target coordinate system and the size of the content 120 in the content coordinate system (step S23). The processing in step S23 is the same as the processing in step S13 shown in FIG. 8.

Subsequently, the processing device 51 determines whether a half value of the width Ttw of the screen area 110 is equal to or smaller than the width Ctw of the content 130 (step S24). When determining that the half value of the width Ttw of the screen area 110 is equal to or smaller than the width Ctw of the content 130 (YES in step S24), the processing device 51 arranges the content 130 in the second position in the screen area 110 and acquires coordinates of the four vertexes of the content 130 and coordinates of the four vertexes of the non-content region 151 (step S25).

On the other hand, when determining that the half value of the width Ttw of the screen area 110 is larger than the width Ctw of the content 130 (NO in step S24), the processing device 51 arranges the content 130 in the fourth position in the screen area 110 and acquires coordinates of the four vertexes of the content 130 and coordinates of the four vertexes of each of the non-content regions 152 and 153 (step S26).

After executing the processing in steps S25 or S26 explained above, the processing device 51 acquires output information (step S27). When shifting to step S27 after step S25, the processing device 51 acquires, as the output information, coordinates of the four vertexes of the content 130 arranged in the second position in the screen area 110, coordinates of the four vertexes of the non-content region 151, the number of non-content regions 151, and a size of the non-content region 151.

When shifting to step S27 after step S26, the processing device 51 acquires, as the output information, the coordinates of the four vertexes of the content 130 arranged in the fourth position in the screen area 110, coordinates of the four vertexes of each of the non-content regions 152 and 153, the number of non-content regions 152 and 153, and sizes of the non-content regions 152 and 153. After executing step S27, the processing device 51 ends the processing of the right arrangement algorithm.

Figures 12, 13:
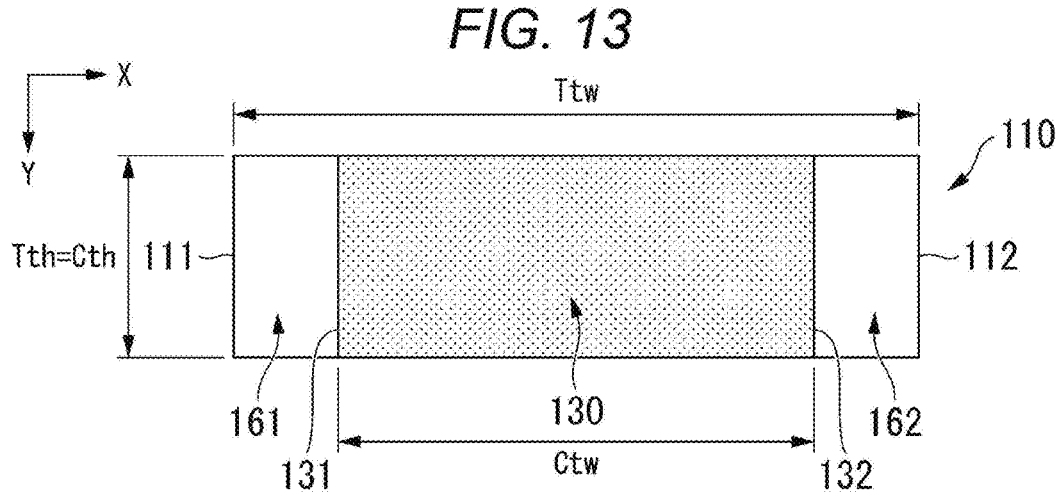
FIG. 12 is a flowchart showing mode switching processing.
FIG. 13 is a diagram showing a state in which the content in the target coordinate system is arranged in a fifth position in the screen area.

FIG. 12 is a flowchart showing mode switching processing for switching the left arrangement algorithm and the right arrangement algorithm according to mode change operation. As shown in FIG. 12, the processing device 51 determines, based on an operation signal input from the operation monitor 40, whether mode change operation by the user has been received (step S31). For example, the mode change operation means that the user taps an icon for mode change included in an operation GUI displayed on the operation monitor 40.

When receiving the mode change operation by the user (YES in step S31), the processing device 51 changes a mode (step S32). For example, when the mode before the mode change operation by the user is received is the first mode, the processing device 51 changes the mode from the first mode to the second mode. For example, when the mode before the mode change operation by the user is received is the second mode, the processing device 51 changes the mode from the second mode to the first mode.

On the other hand, when not receiving the mode change operation by the user (NO in step S31), the processing device 51 skips step S32 and shifts to step S33. That is, in this case, the processing device 51 does not change the mode.

The processing device 51 determines whether the mode is the first mode (step S33). When the mode is the first mode (YES in step S33), the processing device 51 executes the left arrangement algorithm (step S34). On the other hand, when the mode is not the first mode, that is, when the mode is the second mode (NO in step S33), the processing device 51 executes the right arrangement algorithm (step S35). Explanation concerning the processing of the left arrangement algorithm and the right arrangement algorithm is omitted.

Center Arrangement Algorithm

In the following explanation, a center arrangement algorithm for arranging video content supplied from the video supply device 20 in a position in the center in the screen area 110 is explained. The processing device 51 executes the center arrangement algorithm according to a program stored in the memory 52.

The processing device 51 acquires, as input information, a size of the screen area 110 in the target coordinate system and a size of the content 120 in the content coordinate system. Since this processing is the processing of the left arrangement algorithm, explanation is omitted.

The processing device 51 determines, based on the size of the screen area 110 in the target coordinate system and the size of the content 120 in the content coordinate system, which of the screen area 110 and the content 120 is laterally longer.

For example, when the screen area 110 is laterally longer than the content 120 as shown in FIG. 3, the processing device 51 calculates a size of the content 130 in the target coordinate system based on the size of the screen area 110 in the target coordinate system and the size of the content 120 in the content coordinate system. Specifically, the processing device 51 calculates the width Ctw of the content 130 based on the above Expression (2) and calculates the height Cth of the content 130 based on the above Expression (3).

When the screen area 110 is laterally longer than the content 120, the processing device 51 arranges the content 130 in a fifth position where a region in the center of the screen area 110 is occupied by the content 130 and non-content regions are present on both the left and right sides of the content 130.

FIG. 13 is a diagram showing a state in which the content 130 is arranged in the fifth position in the screen area 110. The processing device 51 acquires coordinates of the four vertexes of the content 130 arranged in the fifth position in the screen area 110. A coordinate of the upper left vertex of the content 130 is (Left, 0). Here, Left=(Ttw−Ctw)/2−1. A coordinate of the upper right vertex of the content 130 is (Right, 0). Here, Right=Left+Ctw. A coordinate of the lower left vertex of the content 130 is (Left, Tth−1). A coordinate of the lower right vertex of the content 130 is (Right, Tth−1).

The processing device 51 acquires coordinates of the four vertexes of each of non-content regions 161 and 162 in the screen area 110. As shown in FIG. 13, the non-content region 161 is a region located on the left side of the content 130 arranged in the fifth position among the regions in the screen area 110. The non-content region 162 is a region located on the right side of the content 130 arranged in the fifth position among the regions in the screen area 110.

A coordinate of the upper left vertex of the non-content region 161 is (0, 0). A coordinate of the upper right vertex of the non-content region 161 is (Left−1, 0). A coordinate of the lower left vertex of the non-content region 161 is (0, Tth−1). A coordinate of the lower right vertex of the non-content region 161 is (Left−1, Tth−1).

A coordinate of the upper left vertex of the non-content region 162 is (Right+1, 0). A coordinate of the upper right vertex of the non-content region 162 is (Ttw−1, 0). A coordinate of the lower left vertex of the non-content region 162 is (Right+1, Tth−1). A coordinate of the lower right vertex of the non-content region 162 is (Ttw−1, Tth−1).

The processing device 51 acquires, as output information, coordinates of the four vertexes of the content 130 arranged in the fifth position in the screen area 110, coordinates of the four vertexes of each of the non-content regions 161 and 162, the number of non-content regions 161 and 162, and sizes of the non-content regions 161 and 162.

When the content 130 is arranged in the fifth position in the screen area 110 as explained above, the number of non-content regions 161 and 162 is two. In the size of the non-content region 161, the width of the non-content region 161 is equal to Left and the height of the non-content region 161 is equal to Tth. In the size of the non-content region 162, the width of the non-content region 162 is equal to Ttw-Right and the height of the non-content region 162 is equal to Tth.

Figure 14:
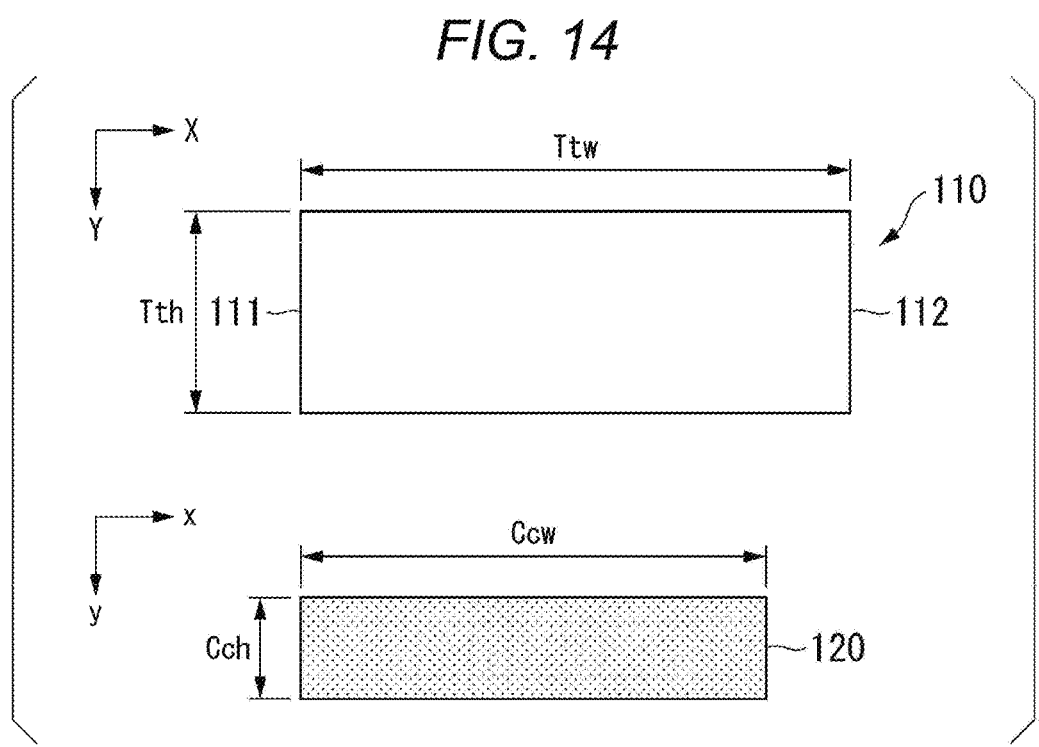
FIG. 14 is a diagram showing an example of a case in which the content in the content coordinate system is laterally longer than the screen area.

FIG. 14 is a diagram showing an example of a case in which the content 120 is laterally longer than the screen area 110. As shown in FIG. 14, when the content 120 is laterally longer than the screen area 110, the processing device 51 calculates the width Ctw of the content 130 in the target coordinate system based on the following Expression (4) and calculates the height Cth of the content 130 in the target coordinate system based on the following Expression (5).

$$Ctw=Ttw \tag{4}$$

$$Cth=Ttw/RCc=Ttw{\times}Cch/Ccw \tag{5}$$

Figure 15:
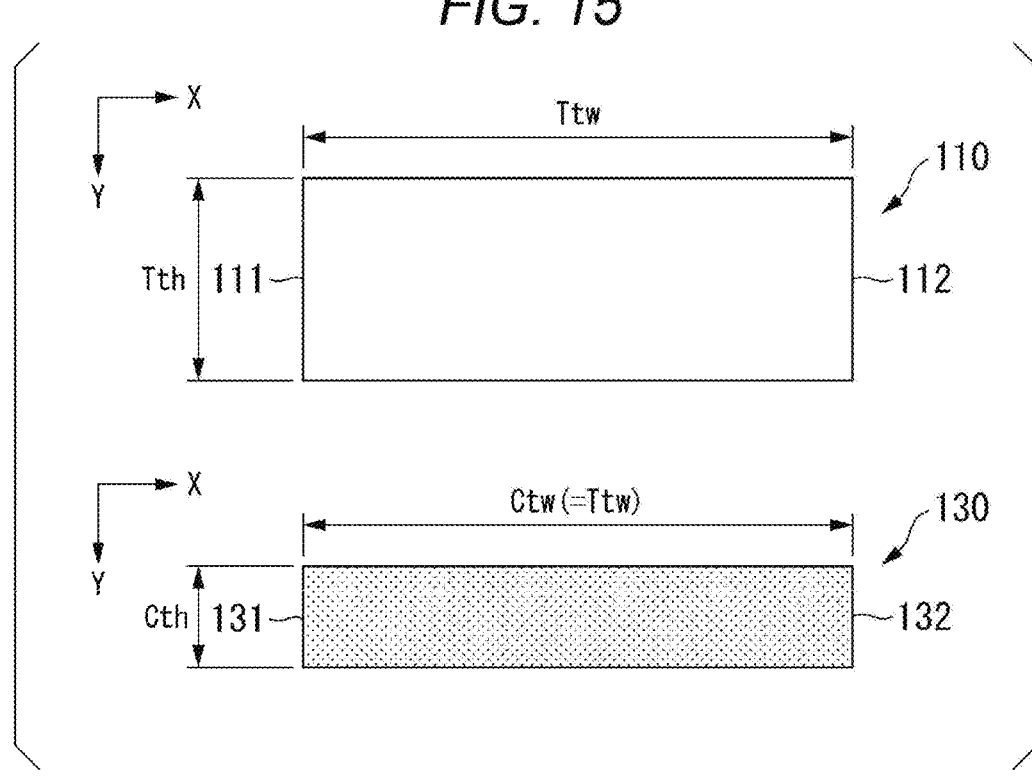
FIG. 15 is a diagram showing an example of a size of the screen area in the target coordinate system and a size of the content in the target coordinate system in the case in which the content in the content coordinate system is laterally longer than the screen area.

FIG. 15 is a diagram showing an example of a size of the screen area 110 in the target coordinate system and a size of the content 130 in the target coordinate system in the case in which the content 120 is laterally longer than the screen area 110. When the content 120 is laterally longer than the screen area 110, the processing device 51 arranges the content 130 in a sixth position where the region in the center in the screen area 110 is occupied by the content 130 and non-content regions are present on both the upper and lower sides of the content 130.

Figure 16:
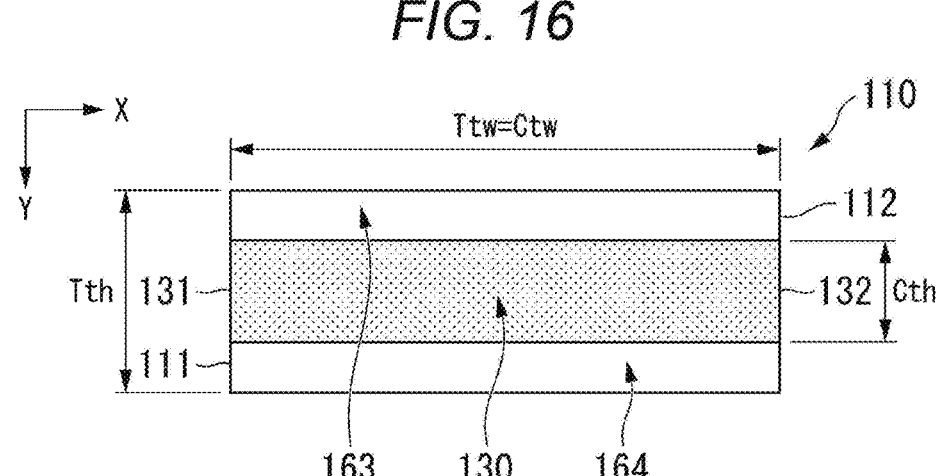
FIG. 16 is a diagram showing a state in which the content is arranged in a sixth position in the screen area.

FIG. 16 is a diagram showing a state in which the content 130 is arranged in the sixth position in the screen area 110. The processing device 51 acquires coordinates of the four vertexes of the content 130 arranged in the sixth position in the screen area 110. A coordinate of the upper left vertex of the content 130 is (0, Top). Here, Top=(Tth−Cth)/2−1. A coordinate of the upper right vertex of the content 130 is (Ttw−1, Top). A coordinate of the lower left vertex of the content 130 is (0, Bottom). Here, Bottom=Top+Cth. A coordinate of the lower right vertex of the content 130 is (Ttw−1, Bottom).

The processing device 51 acquires coordinates of the four vertexes of each of non-content regions 163 and 164 in the screen area 110. As shown in FIG. 16, the non-content region 163 is a region located on the upper side of the content 130 arranged in the sixth position among the regions in the screen area 110. The non-content region 164 is a region located on the lower side of the content 130 arranged in the sixth position among the regions in the screen area 110.

A coordinate of the upper left vertex of the non-content region 163 is (0, 0). A coordinate of the upper right vertex of the non-content region 163 is (Ttw−1, 0). A coordinate of the lower left vertex of the non-content region 163 is (0, Top−1). A coordinate of the lower right vertex of the non-content region 163 is (Ttw−1, Top−1).

A coordinate of the upper left vertex of the non-content region 164 is (0, Bottom+1). A coordinate of the upper right vertex of the non-content region 164 is (Ttw−1, Bottom+1). A coordinate of the lower left vertex of the non-content region 164 is (0, Tth−1). A coordinate of the lower right vertex of the non-content region 164 is (Ttw−1, Tth−1).

The processing device 51 acquires, as output information, coordinates of the four vertexes of the content 130 arranged in the sixth position in the screen area 110, coordinates of the four vertexes of each of the non-content regions 163 and 164, the number of non-content regions 163 and 164, and sizes of the non-content regions 163 and 164.

When the content 130 is arranged in the sixth position in the screen area 110 as explained above, the number of non-content regions 163 and 164 is two. In the size of the non-content region 163, the width of the non-content region 163 is equal to Ttw and the height of the non-content region 163 is equal to Top. In the size of the non-content region 164, the width of the non-content region 164 is equal to Ttw and the height of the non-content region 164 is equal to Tth-Bottom.

The center arrangement algorithm is as explained above.

The processing device 51 generates a first panel image by determining pixel values of the pixels of the first panel based on the output information obtained by executing the center arrangement algorithm, the pixel values of the pixels of the input image (the video content), the first all pixel correspondence map, and the first blend map. The processing device 51 generates a second panel image by determining pixel values of the pixels of the second panel based on the output information obtained by executing the center arrangement algorithm, the pixel values of the pixels of the input image (the video content), the second all pixel correspondence map, and the second blend map. The processing device 51 outputs a first video signal representing the first panel image to the first projector 10A and outputs a second video signal representing the second panel image to the second projector 10B.

Consequently, a rectangular first projection image corresponding to the first panel image is projected onto the projection surface from the first projector 10A and a rectangular second projection image corresponding to the second panel image is projected onto the projection surface from the second projector 10B. As a result, the first projection image and the second projection image are tiled in the screen area 110 on the projection surface, whereby a third display image including video content arranged in the fifth position in the screen area 110 and a fourth display image including video content arranged in the sixth position in the screen area 110 are displayed in the screen area 110.

FIG. 17 is a flowchart showing processing of the center arrangement algorithm. In the following explanation concerning FIG. 17, redundant explanation concerning the center arrangement algorithm explained above is omitted or simplified.

As shown in FIG. 17, when starting execution of the center arrangement algorithm, first, the processing device 51 acquires a size of the screen area 110 in the target coordinate system as input information (step S41). The processing in step S41 is the same as the processing in step S11 shown in FIG. 8.

Subsequently, the processing device 51 acquires a size of the content 120 in the content coordinate system as input information (step S42). The processing in step S42 is the same as the processing in step S12 shown in FIG. 8.

Subsequently, the processing device 51 determines, based on the size of the screen area 110 in the target coordinate system and the size of the content 120 in the content coordinate system, which of the screen area 110 and the content 120 is laterally longer (step S43).

When the screen area 110 is laterally longer than the content 120 (YES in step S43), the processing device 51 calculates a size of the content 130 in the target coordinate system based on the size of the screen area 110 in the target coordinate system and the size of the content 120 in the content coordinate system (step S44). In step S44, the processing device 51 calculates the width Ctw of the content 130 based on the above Expression (2) and calculates the height Cth of the content 130 based on the above Expression (3).

After executing step S44, the processing device 51 arranges the content 130 in the fifth position in the screen area 110 and acquires coordinates of the four vertexes of the content 130 and coordinates of the four vertexes of each of the non-content regions 161 and 162 (step S45).

On the other hand, when the content 120 is laterally longer than the screen area 110 (NO in step S43), the processing device 51 calculates a size of the content 130 in the target coordinate system based on the size of the screen area 110 in the target coordinate system and the size of the content 120 in the content coordinate system (step S46). In step S46, the processing device 51 calculates the width Ctw of the content 130 based on the above Expression (4) and calculates the height Cth of the content 130 based on the above Expression (5).

After executing step S46, the processing device 51 arranges the content 130 in the sixth position in the screen area 110 and acquires coordinates of the four vertexes of the content 130 and coordinates of the four vertexes of each of the non-content regions 163 and 164 (step S47).

After executing the processing in step S45 or S47 explained above, the processing device 51 acquires output information (step S48). When shifting to step S48 after step S45, the processing device 51 acquires, as the output information, coordinates of the four vertexes of the content 130 arranged in the fifth position in the screen area 110, coordinates of the four vertexes of each of the non-content regions 161 and 162, the number of non-content regions 161 and 162, and sizes of the non-content regions 161 and 162.

When shifting to step S48 after step S47, the processing device 51 acquires, as the output information, coordinates of the four vertexes of the content 130 arranged in the sixth position in the screen area 110, coordinates of the four vertexes of each of the non-content regions 163 and 164, the number of non-content regions 163 and 164, and sizes of the non-content regions 163 and 164. After executing step S48, the processing device 51 ends the processing of the center arrangement algorithm.

Content Allocation Processing

In the following explanation, content allocation processing for dividing the regions in the screen area 110 and allocating the regions to a plurality of video contents using the left arrangement algorithm, the right arrangement algorithm, and the center arrangement algorithm is explained. The processing device 51 executes the content allocation processing according to a program stored in the memory 52. Note that, when the number of video contents is one, the processing device 51 only has to calculate coordinates of the four vertexes of the content 130 in the screen area 110 by applying the center arrangement algorithm.

First, the content allocation processing executed by the processing device 51 when the number of video contents is N and main content is absent is explained. Note that N is an integer equal to or larger than 2. The main content is, for example, among a plurality of video contents input to the image generation device 50, video content set as the main content by the user operating the operation monitor 40.

In this case, the processing device 51 calculates coordinates of the four vertexes of each of the video contents in the target coordinate system by applying the center arrangement algorithm to all the video contents. Input information used in executing the center arrangement algorithm includes a size of the content 120 in the content coordinate system, that is, a size of the video content. The input information includes the width Ttw/N of the screen area 110 and the height Tth of the screen area 110.

The processing device 51 translates the four vertexes of each of the video contents in the target coordinate system along the X axis by a movement amount ΔX represented by the following Expression (6). In other words, the processing device 51 adds the movement amount ΔX to an X coordinate among the coordinates of the four vertexes of each of the video contents in the target coordinate system. In Expression (6), n is an order number of the video content and is a serial number starting from 0.

$$\Delta X = n \times Ttw/N \tag{6}$$

Subsequently, the content allocation processing executed by the processing device 51 when the number of video contents is N and main content is present is explained. In this case, the processing device 51 calculates coordinates of the four vertexes of the main content in the screen area 110 and a list of information concerning non-content regions by applying the center arrangement algorithm to the main content. Thereafter, the processing device 51 repeats a series of processing of processing A to processing C explained below until the remaining content is no longer present.

Processing A: The processing device 51 searches for a largest non-content region among a plurality of non-content regions based on the list of the information concerning the non-content regions and calculates coordinates of four vertexes of remaining content by applying the left arrangement algorithm or the right arrangement algorithm to the largest non-content region. For example, when the largest non-content region is located on the left side of the main content in the screen area 110, the processing device 51 applies the left arrangement algorithm. When the largest non-content region is located on the right side of the main content in the screen area 110, the processing device 51 applies the right arrangement algorithm.

Processing B: The processing device 51 deletes information concerning the largest non-content region from the list of the information concerning the non-content regions.

Processing C: The processing device 51 adds information concerning the non-content regions obtained by the processing A to the list.

FIG. 18 is a flowchart showing the content allocation processing. In the following explanation concerning FIG. 18, redundant explanation concerning the content allocation processing explained above is omitted or simplified.

As shown in FIG. 18, when starting the content allocation processing, first, the processing device 51 determines whether main content is absent in a plurality of video contents (step S51). When main content is absent in the plurality of video contents (YES in step S51), the processing device 51 calculates coordinates of the four vertexes of n-th video content in the target coordinate system by applying the center arrangement algorithm to the n-th video content (step S52).

As explained above, n is an order number of video content and is a serial number starting from 0. When processing in step S52 is executed for the first time, a value of n is 0. However, when the processing device 51 returns from step S54 explained below to step S52, the value of n is incremented. Input information used when the center arrangement algorithm is executed includes a size of the content 120 in the content coordinate system, that is, a size of video content. The input information includes the width Ttw/N of the screen area 110 and the height Tth of the screen area 110. As explained above, N is the number of video contents.

After executing step S52, the processing device 51 translates the four vertexes of the n-th video content in the target coordinate system along the X axis by the movement amount ΔX represented by the above Expression (6) (step S53). The processing device 51 determines whether remaining content is absent (step S54).

When remaining content is absent (YES in step S54), the processing device 51 ends the content allocation processing. On the other hand, when remaining content is present (NO in step S54), the processing device 51 returns to step S52 and repeats the processing in step S52 to step S54 until the remaining content is no longer present.

When main content is present in the plurality of video contents (NO in step S51), the processing device 51 calculates coordinates of the four vertexes of the main content in the target coordinate system and a list of information concerning the non-content regions by applying the center arrangement algorithm to the main content (step S55).

After executing step S55, the processing device 51 searches for a largest non-content region among the plurality of non-content regions based on the list of the information concerning the non-content regions and determines whether the largest non-content region is located on the left side of the main content (step S56).

When the largest non-content region is located on the left side of the main content (YES in step S56), the processing device 51 calculates four vertexes of the remaining content by applying the left arrangement algorithm to the largest non-content region (step S57). After calculating the four vertexes of the remaining content according to the left arrangement algorithm in step S57, the processing device 51 deletes information concerning the largest non-content region from the list of the information concerning the non-content regions and adds information concerning the non-content regions obtained by the left arrangement algorithm to the list.

On the other hand, when the largest non-content region is located on the right side of the main content (NO in step S56), the processing device 51 calculates four vertexes of the remaining content by applying the right arrangement algorithm to the largest non-content region (step S58). In step S58, after calculating the four vertexes of the remaining content according to the right arrangement algorithm, the processing device 51 deletes the information concerning the largest non-content region from the list of the information concerning the non-content regions and adds information concerning the non-content regions obtained by the right arrangement algorithm to the list.

After executing step S57 or S58, the processing device 51 determines whether remaining content is absent (step S59). When remaining content is absent (YES in step S59), the processing device 51 ends the content allocation processing. On the other hand, when remaining content is present (NO in step S59), the processing device 51 returns to step S56 and repeats the processing in step S56 to step S59 until the remaining content is no longer present.

Effects of the First Embodiment

As explained above, the display method in the first embodiment includes acquiring the content 130 in the target coordinate system and, when a half value of the width Ttw of the screen area 110 is equal to or smaller than the width Ctw of the content 130, the first projector 10A and the second projector 10B displaying, in the screen area 110, a first display image including the content 130 arranged in a first position where the left side 111 of the screen area 110 and the left side 131 of the content 130 are in contact or a second position where the right side 112 of the screen area 110 and the right side 132 of the content 130 are in contact.

With the display method, when the half value of the width Ttw of the screen area 110 is equal to or smaller than the width Ctw of the content 130, it is possible to display the content 130, that is, video content in the target coordinate system, closer to the left side or the right side in the screen area 110. Therefore, convenience of the user is improved.

The display method in the first embodiment further includes, when the half value of the width Ttw of the screen area 110 is larger than the width Ctw of the content 130, the first projector 10A and the second projector 10B displaying, in the screen area 110, a second display image including the content 130 arranged in a third position where the right side 132 of the content 130 passes the center point Pc of the screen area 110 or a fourth position where the left side 131 of the content 130 passes the center point Pc of the screen area 110.

With the display method, it is possible to display the content 130, that is, the video content in the target coordinate system, closer to the center in the screen area 110 according to a relation between a size of the screen area 110 and a size of the content 130. Therefore, the convenience of the user is improved.

In the display method in the first embodiment, the acquiring the content 130 in the target coordinate system includes generating the content 130 by enlarging or reducing the content 120 such that the height Ccw of the content 120 in the content coordinate system coincides with the height Tth of the screen area 110, and an aspect ratio of the content 130 coincides with an aspect ratio of the content 120.

With the display method, since the height Cth of the content 130 coincides with the height Tth of the screen area 110, it is possible to display, in the screen area 110, the first display image in which the content 130 having more suitable size is arranged.

In the display method in the first embodiment, the first projector 10A and the second projector 10B displaying the first display image in the screen area 110 includes, when Ttw/2Tth×Ccw/Cch is satisfied, where Ttw represents the width of the screen area 110, Tth represents the height of the screen area 110, Ccw represents the width of the content 120, and Cch represents the height of the content 120, displaying the first display image including the content 130 arranged in the first position or the second position.

With the display method, in a state in which a size of the content 120 is known, it is possible to display, based on the size of the content 120, the first display image in which the content 130 is arranged in an appropriate position.

In the display method in the first embodiment, the first projector 10A and the second projector 10B displaying the first display image in the screen area 110 includes, when Ttw/2>Tth×Ccw/Cch is satisfied, where Ttw represents the width of the screen area 110, Tth represents the height of the screen area 110, Ccw represents the width of the content 120, and Cch represents the height of the content 120, displaying the second display image including the content 130 arranged in the third position or the fourth position.

With the display method, in a state in which the size of the content 120 is known, it is possible to display, based on the size of the content 120, the second display image in which the content 130 is arranged in an appropriate position.

In the display method in the first embodiment, the first projector 10A and the second projector 10B displaying the first display image in the screen area 110 includes, in the case of a first mode, displaying the first display image including the content 130 arranged in the first position and, in the case of a second mode, displaying the first display image including the content 130 arranged in the second position.

By setting a mode to the first mode or the second mode, it is possible to set to which of the left side and the right side in the screen area 110 the content 130, that is, the video content in the target coordinate system, is displayed closer. Therefore, it is possible to display the first display image in which the video content is arranged in a position desired by the user.

In the display method in the first embodiment, the width Ttw of the screen area 110 is larger than the width Ctw of the content 130.

With the display method, since the size of the content 130 is not larger than the size of the screen area 110, it is possible to display the first display image in which a part of the content 130 is prevented from protruding from the screen area 110.

The image generation device 50 in the first embodiment includes the processing device 51 that executes acquiring the content 130 in the target coordinate system and, when a half value of the width Ttw of the screen area 110 is equal to or smaller than the width Ctw of the content 130, generating a first display image including the content 130 arranged in a first position where the left side 111 of the screen area 110 and the left side 131 of the content 130 are in contact or a second position where the right side 112 of the screen area 110 and the right side 132 of the content 130 are in contact.

With the image generation device 50 explained above, when the half value of the width Ttw of the screen area 110 is equal to or smaller than the width Ctw of the content 130, it is possible to display the content 130, that is, video content in the target coordinate system, closer to the left side or the right side in the screen area 110. Therefore, convenience of the user is improved.

In the first embodiment, a program stored in the memory 52 causes the processing device 51 to execute acquiring the content 130 in the target coordinate system and, when a half value of the width Ttw of the screen area 110 is equal to or smaller than the width Ctw of the content 130, generating a first display image including the content 130 arranged in a first position where the left side 111 of the screen area 110 and the left side 131 of the content 130 are in contact or a second position where the right side 112 of the screen area 110 and the right side 132 of the content 130 are in contact. The processing device 51 is a form of a computer.

With the program explained above, when the half value of the width Ttw of the screen area 110 is equal to or smaller than the width Ctw of the content 130, it is possible to display the content 130, that is, video content in the target coordinate system, closer to the left side or the right side in the screen area 110. Therefore, convenience of the user is improved.

Second Embodiment

Figure 19:
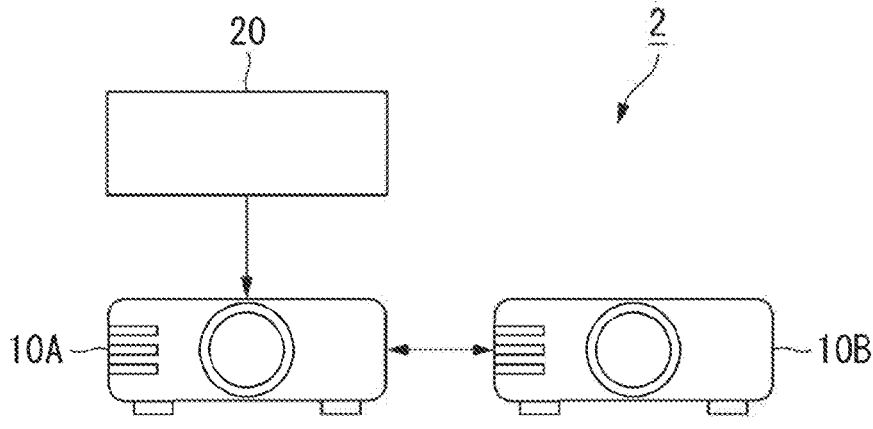
FIG. 19 is a diagram showing a schematic configuration of a projection system in a second embodiment.

A second embodiment of the present disclosure is explained. FIG. 19 is a diagram showing a schematic configuration of a projection system 2 in the second embodiment. As in the first embodiment, the projection system 2 is a multi-projection system that displays one image on a projection surface by tiling images to be projected onto the projection surface from a plurality of projectors.

The projection system 2 includes the first projector 10A, the second projector 10B, and the video supply device 20. The video supply device 20 supplies a video signal, that is, video content to the first projector 10A. The first projector 10A and the second projector 10B are daisy-chained. Note that, although not shown in FIG. 19, the camera 30 may be connected to the first projector 10A when calibration is executed.

Figure 20:
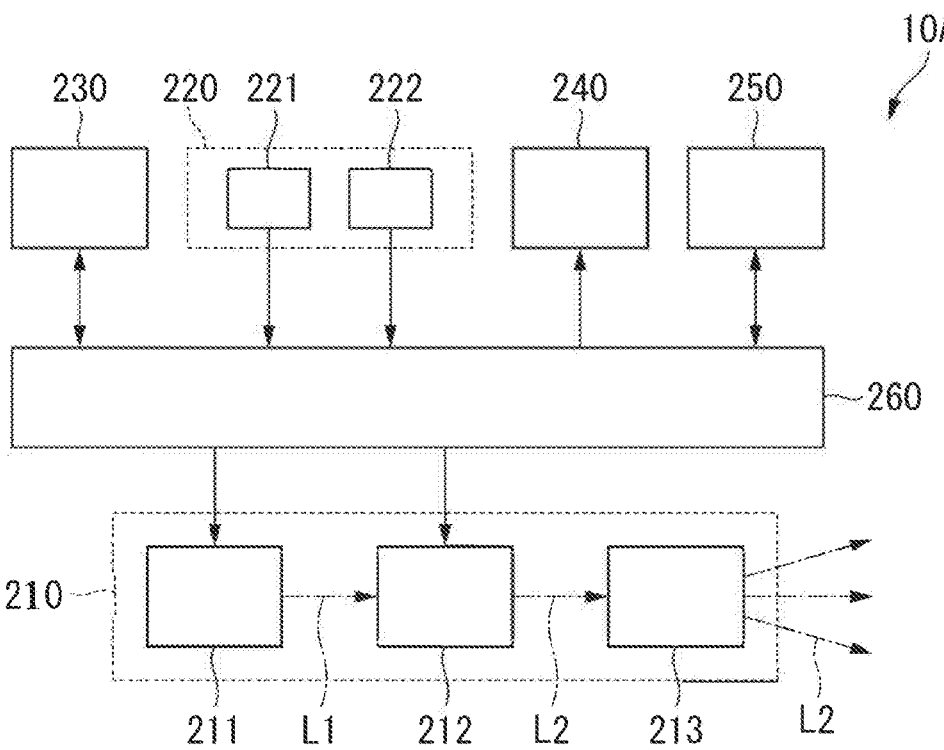
FIG. 20 is a block diagram showing a schematic configuration of a first projector.

FIG. 20 is a block diagram showing a schematic configuration of the first projector 10A. As shown in FIG. 20, the first projector 10A includes an optical device 210, an input device 220, a communication device 230, a speaker 240, a memory 250, and a processing device 260. Note that, although not shown, the second projector 10B includes the same components as the components of the first projector 10A.

The optical device 210 includes a light source 211, a liquid crystal panel 212, and a projection optical system 213. The light source 211 emits white light L1 to the liquid crystal panel 212. The light source 211 is, for example, a mercury lamp, a xenon lamp, an LED (Light Emitting Diode), or a laser light source. A light amount of the white light L1 emitted from the light source 211 is controlled by the processing device 260.

The liquid crystal panel 212 is, for example, a liquid crystal panel of an active drive type including, for each of pixels, a TFT (Thin Film Transistor) functioning as pixel switching element. Light transmittance of the pixels of the liquid crystal panel 212 is controlled by the processing device 260. As a result, the liquid crystal panel 212 functions as a light modulation device. The liquid crystal panel 212 modulates the white light L1 made incident from the light source 211 to thereby emit image light L2 having a mixed color of red, green, and blue to the projection optical system 213. For example, the optical device 210 may include one or more liquid crystal panels or one or more DMDs (Digital Mirror Devices).

The projection optical system 213 is configured by a plurality of optical elements such as lenses and projects the image light L2 made incident from the liquid crystal panel 212 onto the projection surface in an enlarged form. The image light L2 is projected onto the projection surface, whereby a first projection image, which is a color image, is displayed on the projection surface.

The input device 220 is a device that receives input operation of a user to the first projector 10A. As an example, the input device 220 includes an operation panel 221 and a light receiver 222. The operation panel 221 is configured from a plurality of operation keys provided in the first projector 10A. The operation keys include, for example, a power key, a menu call key, direction keys, a determination key, and a volume adjustment key. The operation keys may be hardware keys or may be software keys displayed on a touch panel provided in the first projector 10A. The operation panel 221 outputs electric signals generated by the operation keys being operated by the user to the processing device 260 as operation signals.

The light receiver 222 includes a photoelectric conversion circuit that receives infrared light transmitted from a remote controller (not shown) of the first projector 10A and converts the infrared light into an electric signal. The light receiver 222 outputs the electric signal obtained by the photoelectric conversion of the infrared light to the processing device 260 as a remote operation signal. A plurality of operation keys are provided in the remote controller as in the operation panel 221. The remote controller converts an electric signal generated by the operation keys provided in the remote controller being operated by the user into infrared light and transmits the infrared light to the first projector 10A. That is, the remote operation signal output from the light receiver 222 is substantially the same as the electric signal generated by the operation keys of the remote controller being operated by the user. Note that, when the remote controller transmits a radio wave signal according to a short range wireless communication standard such as Bluetooth (registered trademark), a reception device that receives the radio wave signal may be provided instead of the light receiver 222.

The communication device 230 communicates with the video supply device 20 and the second projector 10B. The speaker 240 is controlled by the processing device 260 to output voice having predetermined volume. The memory 250 includes a nonvolatile memory that stores programs, various setting data, and the like necessary for causing the processing device 260 to execute various kinds of processing and a volatile memory used as a temporary storage destination of data when the processing device 260 executes the various kinds of processing.

The processing device 260 is a processor that controls an overall operation of the first projector 10A according to a program stored in advance in the memory 250. As an example, the processing device 260 is configured by a single or a plurality of CPUs. A part or all of functions of the processing device 260 may be configured by circuits such as a DSP, an ASIC, a PLD, and an FPGA. The processing device 260 executes various kinds of processing in parallel or sequentially.

The processing device 260 executes calibration, a left arrangement algorithm, a right arrangement algorithm, a center arrangement algorithm, mode switching processing, content allocation processing, and the like according to programs stored in advance in the memory 250. Since these kinds of processing are explained in the first embodiment, explanation is omitted in the second embodiment.

Effects of the Second Embodiment

As explained above, the first projector 10A in the second embodiment includes the processing device 260 that executes acquiring the content 130 in the target coordinate system and, when a half value of the width Ttw of the screen area 110 is equal to or smaller than the width Ctw of the content 130, generating a first display image including the content 130 arranged in a first position where the left side 111 of the screen area 110 and the left side 131 of the content 130 are in contact or a second position where the right side 112 of the screen area 110 and the right side 132 of the content 130 are in contact.

With the first projector 10A explained above, when the half value of the width Ttw of the screen area 110 is equal to or smaller than the width Ctw of the content 130, it is possible to display the content 130, that is, video content in the target coordinate system, closer to the left side or the right side in the screen area 110. Therefore, convenience of the user is improved.

The embodiments of the present disclosure are explained above. However, the technical scope of the present disclosure is not limited to the embodiments. Various changes can be added without departing from the gist of the present disclosure.

For example, in the embodiments, the projection systems 1 and 2 each including the two projectors 10A and 10B as the display devices are illustrated. However, the present disclosure is not limited to this. The number of projectors only has to be one or more. The display devices each are not limited to the projector and may be another display device such as a liquid crystal display or an organic EL (Electro Luminescence) display.

Summary of the Present Disclosure

A summary of the present disclosure is noted below.

Note 1

A display method including: acquiring a rectangular first image; and, when a half value of a first size indicating a size on a first axis of a rectangular display region where an image is displayed by one or more display devices is equal to or smaller than a second size indicating a size on the first axis of the first image, the one or more display devices displaying, in the display region, a first display image including the first image arranged in a first position, where a first side orthogonal to the first axis and located on one side of the first axis among four sides of the display region and a third side orthogonal to the first axis and located on the one side among four sides of the first image are in contact, or a second position where a second side opposed to the first side among the four sides of the display region and a fourth side opposed to the third side among the four sides of the first image are in contact.

With the display method described in Note 1, when the half value of the first size of the display region is equal to or smaller than the second size of the first image, it is possible to display the first image closer to one side or the other side of the first axis in the display region. Therefore, convenience of a user is improved.

Note 2

The display method described in Note 1, further including, when the half value of the first size is larger than the second size, the one or more display devices displaying, in the display region, a second display image including the first image arranged in a third position where the fourth side of the first image passes a center point of the display region or a fourth position where the third side of the first image passes the center point.

With the display method described in Note 2, it is possible to display the first image closer to the center in the display region according to a relation between a size of the display region and a size of the first image. Therefore, the convenience of the user is improved.

Note 3

The display method described in Note 1 or 2, wherein the acquiring the first image includes generating the first image by enlarging or reducing the second image such that a third size indicating a size of a rectangular second image on a second axis orthogonal to the first axis coincides with a fourth size indicating a size on the second axis of the display region, and an aspect ratio of the first image coincides with an aspect ratio of the second image.

With the display method described in Note 3, since the third size of the second image coincides with the fourth size of the display region, it is possible to display, in the display region, the first display image in which the first image having more suitable size is arranged.

Note 4

The display method described in Note 3, wherein the one or more display devices displaying the first display image in the display region includes, when Ttw/2Tth×Ccw/Cch is satisfied, where Ttw represents the first size, Tth represents the fourth size, Ccw represents the size on the first axis of the second image, and Cch represents the third size, displaying the first display image including the first image arranged in the first position or the second position.

With the display method described in Note 4, in the state in which the size of the second image is known, the first image is arranged based on the size of the second image. Therefore, it is possible to display the first display image in which the first image is arranged in an appropriate position.

Note 5

The display method described in Note 3, wherein the one or more display devices displaying the second display image in the display region includes, when Ttw/2>Tth×Ccw/Cch is satisfied, where Ttw represents the first size, Tth represents the fourth size, Ccw represents the size on the first axis of the second image, and Cch represents the third size, displaying the second display image including the first image arranged in the third position or the fourth position.

With the display method described in Note 5, in the state in which the size of the second image is known, the first image is arranged based on the size of the second image. Therefore, it is possible to display the second display image in which the first image is arranged in an appropriate position.

Note 6

The display method described in any one of Notes 1 to 5, wherein the one or more display devices displaying the first display image in the display region includes: in a case of a first mode, displaying the first display image including the first image arranged in the first position; and, in a case of a second mode, displaying the first display image including the first image arranged in the second position.

With the display method described in Note 6, by setting a mode to the first mode or the second mode, it is possible to set to which of one side and the other side in the display region the first image is displayed closer. Therefore, it is possible to display the first display image in which the first image is arranged in a position desired by the user.

Note 7

The display method described in any one of Notes 1 to 6, wherein the first size is larger than the second size.

With the display method described in Note 7, since the size of the first image is not larger than the size of the display region, it is possible to display the first display image in which a part of the first image is prevented from protruding from the display region.

Note 8

A display device including a processing device configured to execute: acquiring a rectangular first image; and, when a half value of a first size indicating a size on a first axis of a rectangular display region where an image is displayed by one or more display devices is equal to or smaller than a second size indicating a size on the first axis of the first image, generating a first display image including the first image arranged in a first position, where a first side orthogonal to the first axis and located on one side of the first axis among four sides of the display region and a third side orthogonal to the first axis and located on the one side among four sides of the first image are in contact, or a second position where a second side opposed to the first side among the four sides of the display region and a fourth side opposed to the third side among the four sides of the first image are in contact.

With the display device described in Note 8, when the half value of the first size of the display region is equal to or smaller than the second size of the first image, it is possible to display the first image closer to one side or the other side of the first axis in the display region. Therefore, convenience of a user is improved.

Note 9

An image generation device including a processing device configured to execute: acquiring a rectangular first image; and, when a half value of a first size indicating a size on a first axis of a rectangular display region where an image is displayed by one or more display devices is equal to or smaller than a second size indicating a size on the first axis of the first image, generating a first display image including the first image arranged in a first position, where a first side orthogonal to the first axis and located on one side of the first axis among four sides of the display region and a third side orthogonal to the first axis and located on the one side among four sides of the first image are in contact, or a second position where a second side opposed to the first side among the four sides of the display region and a fourth side opposed to the third side among the four sides of the first image are in contact.

With the image generation device described in Note 9, when the half value of the first size of the display region is equal to or smaller than the second size of the first image, it is possible to display the first image closer to one side or the other side of the first axis in the display region. Therefore, convenience of a user is improved.

Note 10

A non-transitory computer-readable storage medium storing a program, the program causing a computer to execute: acquiring a rectangular first image; and, when a half value of a first size indicating a size on a first axis of a rectangular display region where an image is displayed by one or more display devices is equal to or smaller than a second size indicating a size on the first axis of the first image, generating a first display image including the first image arranged in a first position, where a first side orthogonal to the first axis and located on one side of the first axis among four sides of the display region and a third side orthogonal to the first axis and located on the one side among four sides of the first image are in contact, or a second position where a second side opposed to the first side among the four sides of the display region and a fourth side opposed to the third side among the four sides of the first image are in contact.

With the non-transitory computer-readable storage medium storing the program described in Note 10, when the half value of the first size of the display region is equal to or smaller than the second size of the first image, it is possible to display the first image closer to one side or the other side of the first axis in the display region. Therefore, convenience of a user is improved.

What is claimed is:

1. A display method comprising:

acquiring a rectangular first image;

determining whether a half value of a first size indicating a size on a first axis of a rectangular display region where an image is displayed by one or more display devices is equal to or smaller than a second size indicating a size on the first axis of the first image; and based on a result of the determining, when the half value of the first size is equal to or smaller than the second size, the one or more display devices displaying, in the display region, a first display image including the first image arranged in a first position, where a first side orthogonal to the first axis and located on one side of the first axis among four sides of the display region and a third side orthogonal to the first axis and located on the one side among four sides of the first image are in contact, or a second position where a second side opposed to the first side among the four sides of the display region and a fourth side opposed to the third side among the four sides of the first image are in contact, wherein the first size is larger than the second size.

2. The display method according to claim 1, further comprising, when the half value of the first size is larger than the second size, the one or more display devices displaying, in the display region, a second display image including the first image arranged in a third position where the fourth side of the first image passes a center point of the display region or a fourth position where the third side of the first image passes the center point.

3. The display method according to claim 2, wherein the acquiring the first image includes generating the first image by enlarging or reducing the second image such that a third size indicating a size of a rectangular second image on a second axis orthogonal to the first axis coincides with a fourth size indicating a size on the second axis of the display region, and an aspect ratio of the first image coincides with an aspect ratio of the second image.

4. The display method according to claim 3, wherein the one or more display devices displaying the first display image in the display region includes, when $Ttw/2 \leq Tth \times (Ccw/Cch)$ is satisfied, where Ttw represents the first size, Tth represents the fourth size, Ccw represents the size on the first axis of the second image, and Cch represents the third size, displaying the first display image including the first image arranged in the first position or the second position.

5. The display method according to claim 3, wherein the one or more display devices displaying the second display image in the display region includes, when $Ttw/2 > Tth \times (Ccw/Cch)$ is satisfied, where Ttw represents the first size, Tth represents the fourth size, Ccw represents the size on the first axis of the second image, and Cch represents the third size, displaying the second display image including the first image arranged in the third position or the fourth position.

6. The display method according to claim 1, wherein the one or more display devices displaying the first display image in the display region includes:

in a case of a first mode, displaying the first display image including the first image arranged in the first position; and in a case of a second mode, displaying the first display image including the first image arranged in the second position.

7. The display method according to claim 1, wherein the rectangular display region is a largest rectangular region that fits within an inner side of a projection region, the projection region being displayed by the one or more display devices.

8. The display method according to claim 7, further comprising, capturing a captured image that includes at least a portion of the projection region, and acquiring the largest rectangular region based on the captured image.

9. The display method according to claim 1, further comprising, acquiring the first size, and capturing a captured image that includes at least a portion of a projection region, the projection region being displayed by the one or more display devices, wherein acquiring the first size includes acquiring the first size based on the captured image.

10. The display method according to claim 1, further comprising:

after the determining, calculating output information, based on the first size and the second size, for generating an image to be displayed in a superimposed manner by a plurality of display devices, wherein the output information includes at least one of:

coordinates of four vertices of the first display image in the display region, coordinates of four vertices of a first region in the display region in which the first display image is not displayed, a number of one or more first regions, a size of the one or more first regions on the first axis, and a size of the one or more first regions on a second axis orthogonal to the first axis.

11. An image generation device comprising a processing device configured to execute:

acquiring a rectangular first image;

determining whether a half value of a first size indicating a size on a first axis of a rectangular display region where an image is displayed by one or more display devices is equal to or smaller than a second size indicating a size on the first axis of the first image; and based on a result of the determining, when the half value of the first size is equal to or smaller than the second size, generating a first display image including the first image arranged in a first position, where a first side orthogonal to the first axis and located on one side of the first axis among four sides of the display region and a third side orthogonal to the first axis and located on the one side among four sides of the first image are in contact, or a second position where a second side opposed to the first side among the four sides of the display region and a fourth side opposed to the third side among the four sides of the first image are in contact, wherein the first size is larger than the second size.

12. The image generation device of claim 11, wherein
the rectangular display region is a largest rectangular
region that fits within an inner side of a projection
region, the projection region being displayed by the one
or more display devices.

13. The image generation device of claim 12, the processing device further configured to execute:
capturing a captured image that includes at least a portion
of the projection region, and
acquiring the largest rectangular region based on the
captured image.

14. The image generation device of claim 11, the processing device further configured to execute:
acquiring the first size, and
capturing a captured image that includes at least a portion
of a projection region, the projection region being
displayed by the one or more display devices,
wherein acquiring the first size includes acquiring the first
size based on the captured image.

15. The image generation device of claim 11, the processing device further configured to execute:
when the half value of the first size is larger than the
second size, generating a second display image including the first image arranged in a third position where the
fourth side of the first image passes a center point of the
display region, or a fourth position where the third side
of the first image passes the center point.

16. The image generation device of claim 11, the processing device further configured to execute:
after the determining, calculating output information,
based on the first size and the second size, for generating an image to be displayed in a superimposed
manner by a plurality of display devices, wherein the
output information includes at least one of:
coordinates of four vertices of the first display image in
the display region,
coordinates of four vertices of a first region in the
display region in which the first display image is not
displayed,
a number of one or more first regions,
a size of the one or more first regions on the first axis, and
a size of the one or more first regions on a second axis
orthogonal to the first axis.

17. A non-transitory computer-readable storage medium
storing a program executable by a computer, the program
causing the computer to execute:
acquiring a rectangular first image;
determining whether a half value of a first size indicating
a size on a first axis of a rectangular display region
where an image is displayed by one or more display
devices is equal to or smaller than a second size
indicating a size on the first axis of the first image; and
based on a result of the determining, when the half value
of the first size is equal to or smaller than the second
size, the one or more display devices displaying, in the
display region, a first display image including the first
image arranged in a first position, where a first side
orthogonal to the first axis and located on one side of
the first axis among four sides of the display region and a third side orthogonal to the first axis and located on
the one side among four sides of the first image are in
contact, or a second position where a second side
opposed to the first side among the four sides of the
display region and a fourth side opposed to the third
side among the four sides of the first image are in
contact, wherein the first size is larger than the second
size.

18. The non-transitory computer-readable storage
medium of claim 17, wherein
the rectangular display region is a largest rectangular
region that fits within an inner side of a projection
region, the projection region being displayed by the one
or more display devices.

19. The non-transitory computer-readable storage
medium of claim 18, the program further causes the computer to execute:
capturing a captured image that includes at least a portion
of the projection region, and
acquiring the largest rectangular region based on the
captured image.

20. The non-transitory computer-readable storage
medium of claim 17, the program further causes the computer to execute:
acquiring the first size, and
capturing a captured image that includes at least a portion
of a projection region, the projection region being
displayed by the one or more display devices,
wherein acquiring the first size includes acquiring the first
size based on the captured image.

21. The non-transitory computer-readable storage
medium of claim 17, wherein the program further causes the
computer to execute:
when the half value of the first size is larger than the
second size, the one or more display devices displaying, in the display region, a second display image
including the first image arranged in a third position
where the fourth side of the first image passes a center
point of the display region or a fourth position where
the third side of the first image passes the center point.

22. The non-transitory computer-readable storage
medium of claim 17, the program further causes the computer to execute:
after the determining, calculating output information,
based on the first size and the second size, for generating an image to be displayed in a superimposed
manner by a plurality of display devices, wherein the
output information includes at least one of:
coordinates of four vertices of the first display image in
the display region,
coordinates of four vertices of a first region in the
display region in which the first display image is not
displayed,
a number of one or more first regions,
a size of the one or more first regions on the first axis,
and
a size of the one or more first regions on a second axis
orthogonal to the first axis.

\* \* \* \* \*